United States Patent
Natu et al.

(10) Patent No.: US 9,411,762 B2
(45) Date of Patent: Aug. 9, 2016

(54) METHOD AND SYSTEM FOR PLATFORM MANAGEMENT MESSAGES ACROSS PERIPHERAL COMPONENT INTERCONNECT EXPRESS (PCIE) SEGMENTS

(71) Applicants: Mahesh Natu, Sunnyvale, CA (US); Mohan Nair, Portland, OR (US)

(72) Inventors: Mahesh Natu, Sunnyvale, CA (US); Mohan Nair, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 13/843,066

(22) Filed: Mar. 15, 2013

(65) Prior Publication Data

US 2014/0281070 A1    Sep. 18, 2014

(51) Int. Cl.
*G06F 12/06*    (2006.01)
*G06F 13/40*    (2006.01)
*G06F 13/38*    (2006.01)

(52) U.S. Cl.
CPC .............. *G06F 13/385* (2013.01); *G06F 12/06* (2013.01)

(58) Field of Classification Search
CPC ..... G06F 13/40; G06F 12/06; G06F 12/0623; G06F 12/0615

USPC .......................................... 710/105
See application file for complete search history.

(56) References Cited

U.S. PATENT DOCUMENTS

| | | | |
|---|---|---|---|
| 2009/0083760 A1 | 3/2009 | Slaight | |
| 2009/0164694 A1* | 6/2009 | Talayco et al. | 710/316 |
| 2011/0138082 A1* | 6/2011 | Khatri et al. | 710/8 |
| 2012/0207155 A1* | 8/2012 | Nelogal et al. | 370/389 |
| 2012/0274567 A1* | 11/2012 | Suggs | 345/168 |
| 2013/0346666 A1* | 12/2013 | Chang et al. | 710/313 |

FOREIGN PATENT DOCUMENTS

| | | |
|---|---|---|
| EP | 2515241 A2 | 10/2012 |
| EP | 2515241 A3 | 9/2013 |

OTHER PUBLICATIONS

European Search Report from foreign counterpart European Patent Application No. 14159595.9, mailed Jul. 31, 2014, 8 pages.
"Management Component Transport Protocol (MCTP) PCIe VDM Transport Binding Specification", DMTF Standard Specification, DSP0238, Version 1.0.1, Dec. 11, 2009, pp. 1-19.

* cited by examiner

*Primary Examiner* — Tim T Vo
*Assistant Examiner* — Phong H Dang
(74) *Attorney, Agent, or Firm* — Blakely, Sokoloff, Taylor & Zafman LLP

(57) ABSTRACT

A method is disclosed to manage platform management messages through multiple peripheral component interconnect express (PCIe) segments implemented on a root complex of a computing system.

25 Claims, 16 Drawing Sheets

METHOD AND SYSTEM FOR PLATFORM MANAGEMENT MESSAGES ACROSS PERIPHERAL COMPONENT INTERCONNECT EXPRESS (PCIE) SEGMENTS

FIELD

The embodiments of the invention are related to management of computer systems in general. More specifically, the embodiments of the invention relate to a method and system for platform management messages transmitting across one or more peripheral component interconnect express (PCIe) segments.

BACKGROUND

A typical server platform includes multiple processor sockets, a memory subsystem, and a number of PCI Express (PCIe) controllers. The level of robust platform management is one of the key attributes that distinguish a server from a platform targeted for individual use, such as personal computers, laptops, notebooks, tablets, smartphones, etc. The management of a server platform is typically orchestrated by a baseboard management controller (BMC). The BMC allows the platform to be remotely managed through use of an application or web-based interface including a remote management console and uses a sideband path into the network controller to facilitate communication between the BMC and the remote management console. Since server management is a complex task, the BMC offloads some of the responsibilities to a management engine (ME). The ME is configured to perform various platform management tasks via communication with platform components over applicable interconnects, and communicates component operating parameters and associated data back to the BMC.

Several manageability applications require relatively high bandwidth (~10 MB/s) and low latency communication paths between various components. Media redirection (mounting a remote drive) and video redirection are two examples of such applications. In current server platforms, a fast sideband bus such as reduced media independent interface (RMII) or an internal bus is used to meet these needs. A dedicated sideband bus increases component costs (more pins) and limits motherboard placement options. Internal busses limit mix and match configurations such as preventing media redirection using a discrete local area network (LAN) or discrete graphics component. Thus, a different approach is desired for manageability applications.

Management Component Transport Protocol (MCTP) is a protocol standard developed by Distributed Management Task Force (DMTF) platform management. It is designed to support communications between different intelligent hardware components making up a platform management subsystem that provides monitoring and control functions inside a managed system. "MCTP PCIe Vendor Defined Message (VDM) Transport Binding Protocol" is a DMTF-authored specification that defines how MCTP packets may be sent over a PCI Express (PCIe) bus. MCTP over PCIe enables high bandwidth management traffic to be multiplexed over PCIe busses. Since most management components are already hooked up to one of these busses, this approach eliminates the need for a separate high bandwidth bus and enables more flexible arrangement of manageability components. Each of these components can be an "MCTP endpoint" and exchange messages over the existing fabric. When transported over PCIe, MCTP packets take the form of a Vendor Defined Message (VDM). In addition, MCTP or more generically PCI Express VDMs can be utilized for managing the processor complexes themselves (e.g. processor thermals, power and errors). However, MCTP or more generically PCI Express VDMs can specify only up to 256 busses due to length limitation of addresses within VDM format.

A larger server platform with one or more processor sockets may contain more than 256 PCIe busses. This kind of server platform may be managed by a single BMC. For that, BMC must be able to address more than 256 PCIe busses. Peripheral Component Interconnect Special Interest Group (PCI-SIG) is an electronics industry consortium that specifies various peripheral interconnects, including PCIe computer busses. PCI-SIG has proposed a PCI Firmware Specification that introduces the notion of PCIe bus segments, where each PCIe bus segment may include up to 256 PCIe busses. A server platform may have multiple PCIe bus segments, thus all PCIe bus segments together may contain more than 256 PCIe busses. The server platform containing multiple PCIe bus segments presents a challenge for a VDM/MCTP based transportation as VDM format as defined does not contain a field for PCIe bus segments.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 11:
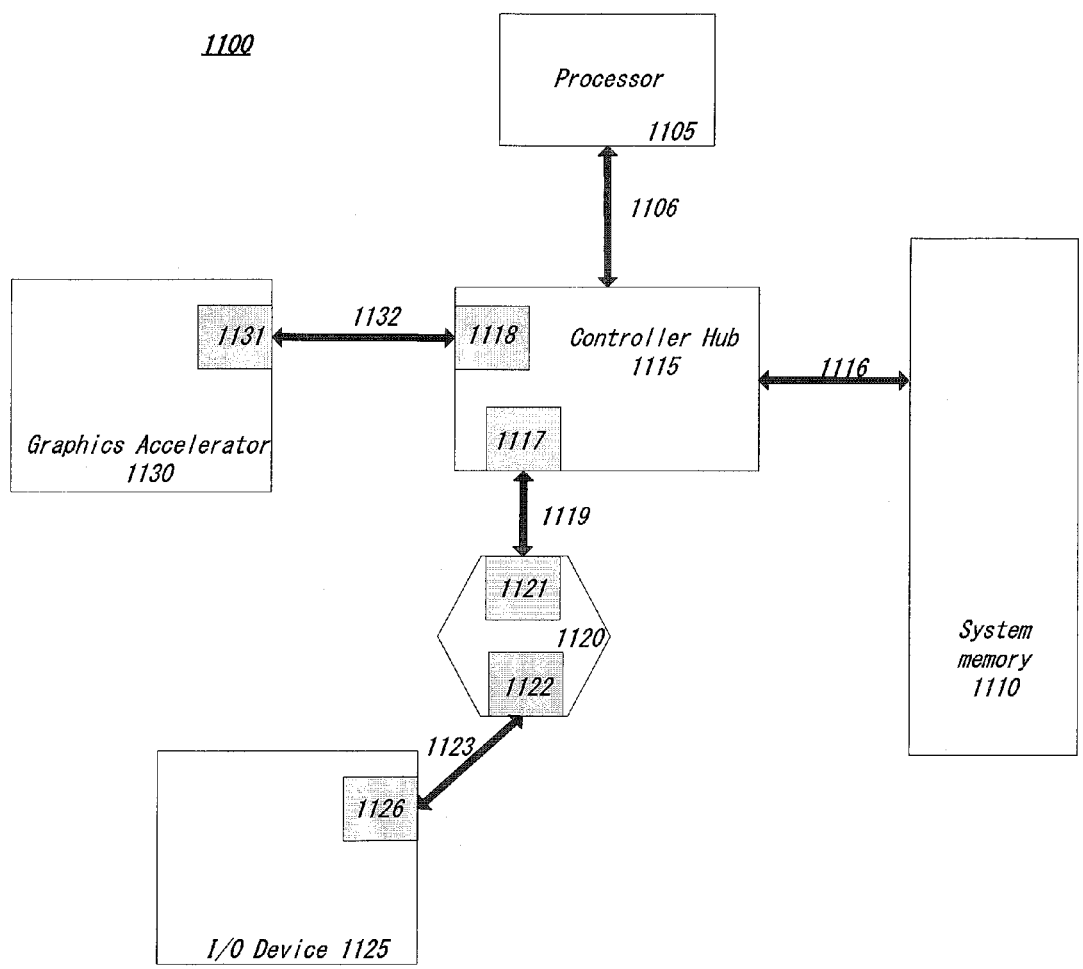
FIG. 11 illustrates an embodiment of a computing system including a peripheral component interconnect express (PCIe) compliant architecture.

Referring to FIG. 11, an embodiment of a fabric composed of point-to-point Links that interconnect a set of components is illustrated. System 1100 includes processor 1105 and system memory 1110 coupled to controller hub 1115. Processor 1105 includes any processing element, such as a microprocessor, a host processor, an embedded processor, a co-processor, or other processor. Processor 1105 is coupled to controller hub 1115 through front-side bus (FSB) 1106. In one embodiment, FSB 1106 is a serial point-to-point interconnect as described below. In another embodiment, link 1106 includes a serial, differential interconnect architecture that is compliant with different interconnect standard.

System memory 1110 includes any memory device, such as random access memory (RAM), non-volatile (NV) memory, or other memory accessible by devices in system 1100. System memory 1110 is coupled to controller hub 1115 through memory interface 1116. Examples of a memory interface include a double-data rate (DDR) memory interface, a dual-channel DDR memory interface, and a dynamic RAM (DRAM) memory interface.

In one embodiment, controller hub 1115 is a root hub, root complex, or root controller in a Peripheral Component Interconnect Express (PCIe or PCIE) interconnection hierarchy. Examples of controller hub 1115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 1105, while controller 1115 is to communicate with I/O devices, in a similar manner as described below. In some embodiments, peer-to-peer routing is optionally supported through root complex 1115.

Here, controller hub 1115 is coupled to switch/bridge 1120 through serial link 1119. Input/output modules 1117 and 1121, which may also be referred to as interfaces/ports 1117 and 1121, include/implement a layered protocol stack to provide communication between controller hub 1115 and switch 1120. In one embodiment, multiple devices are capable of being coupled to switch 1120.

Switch/bridge 1120 routes packets/messages from device 1125 upstream, i.e. up a hierarchy towards a root complex, to controller hub 1115 and downstream, i.e. down a hierarchy away from a root controller, from processor 1105 or system memory 1110 to device 1125. Switch 1120, in one embodiment, is referred to as a logical assembly of multiple virtual PCI-to-PCI bridge devices. Device 1125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1125 may include a PCIe to PCI/PCI-X bridge to support legacy or other version PCI devices. Endpoint devices in PCIe are often classified as legacy, PCIe, or root complex integrated endpoints.

Graphics accelerator 1130 is also coupled to controller hub 1115 through serial link 1132. In one embodiment, graphics accelerator 1130 is coupled to an MCH, which is coupled to an ICH. Switch 1120, and accordingly I/O device 1125, is then coupled to the ICH. I/O modules 1131 and 1118 are also to implement a layered protocol stack to communicate between graphics accelerator 1130 and controller hub 1115. Similar to the MCH discussion above, a graphics controller or the graphics accelerator 1130 itself may be integrated in processor 1105.

Figure 12:
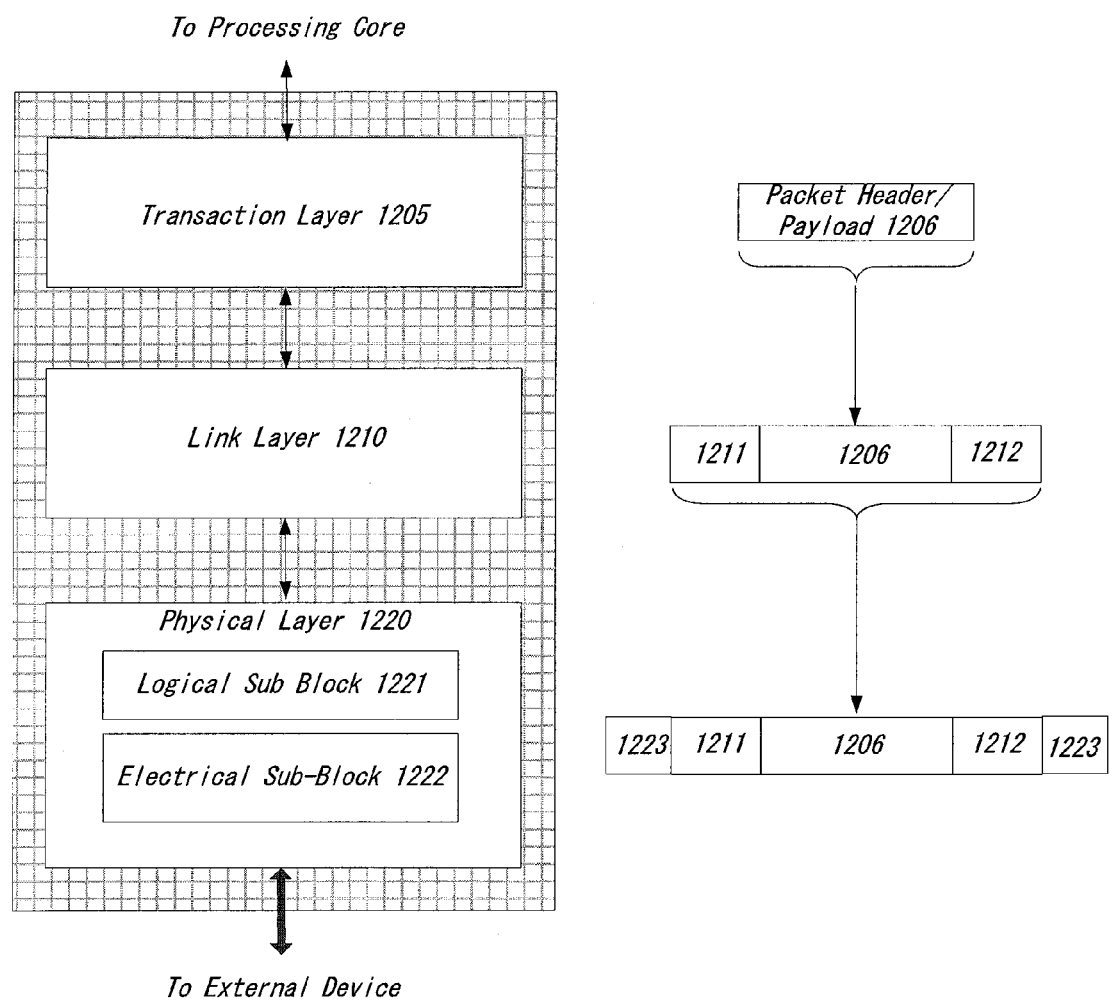
FIG. 12 illustrates an embodiment of a PCIe compliant interconnect architecture including a layered stack.

Turning to FIG. 12 an embodiment of a layered protocol stack is illustrated. Layered protocol stack 1200 includes any form of a layered communication stack, such as a Quick Path Interconnect (QPI) stack, a PCie stack, a next generation high performance computing interconnect stack, or other layered stack. Although the discussion immediately below in reference to FIGS. 11-14 are in relation to a PCIe stack, the same concepts may be applied to other interconnect stacks. In one embodiment, protocol stack 1200 is a PCIe protocol stack including transaction layer 1205, link layer 1210, and physical layer 1220. An interface, such as interfaces 1117, 1118, 1121, 1122, 1126, and 1131 in FIG. 1, may be represented as communication protocol stack 1200. Representation as a communication protocol stack may also be referred to as a module or interface implementing/including a protocol stack.

PCI Express uses packets to communicate information between components. Packets are formed in the Transaction Layer 1205 and Data Link Layer 1210 to carry the information from the transmitting component to the receiving component. As the transmitted packets flow through the other layers, they are extended with additional information necessary to handle packets at those layers. At the receiving side the reverse process occurs and packets get transformed from their Physical Layer 1220 representation to the Data Link Layer 1210 representation and finally (for Transaction Layer Packets) to the form that can be processed by the Transaction Layer 1205 of the receiving device.

Transaction Layer

In one embodiment, transaction layer 1205 is to provide an interface between a device's processing core and the interconnect architecture, such as data link layer 1210 and physical layer 1220. In this regard, a primary responsibility of the transaction layer 1205 is the assembly and disassembly of packets (i.e., transaction layer packets, or TLPs). The translation layer 1205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1205. An external device at the opposite end of the link, such as controller hub 515 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1205 assembles packet header/payload 1206. Format for current packet headers/payloads may be found in the PCIe specification at the PCIe specification website.

Figure 13:
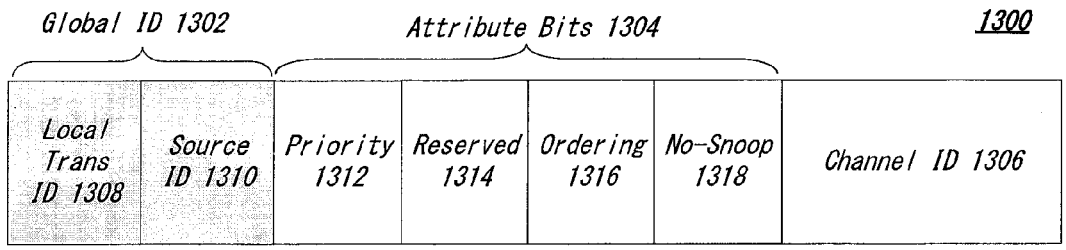
FIG. 13 illustrates an embodiment of a PCIe compliant request or packet to be generated or received within an interconnect architecture.

Quickly referring to FIG. 13, an embodiment of a PCIe transaction descriptor is illustrated. In one embodiment, transaction descriptor 1300 is a mechanism for carrying transaction information. In this regard, transaction descriptor 1300 supports identification of transactions in a system. Other potential uses include tracking modifications of default transaction ordering and association of transaction with channels.

Transaction descriptor 1300 includes global identifier field 1302, attributes field 1304 and channel identifier field 1306. In the illustrated example, global identifier field 1302 is depicted comprising local transaction identifier field 1308 and source identifier field 1310. In one embodiment, global transaction identifier 1302 is unique for all outstanding requests.

According to one implementation, local transaction identifier field 1308 is a field generated by a requesting agent, and it is unique for all outstanding requests that require a completion for that requesting agent. Furthermore, in this example, source identifier 1310 uniquely identifies the requestor agent within a PCIe hierarchy. Accordingly, together with source ID 1310, local transaction identifier 1308 field provides global identification of a transaction within a hierarchy domain.

Attributes field 1304 specifies characteristics and relationships of the transaction. In this regard, attributes field 1304 is potentially used to provide additional information that allows modification of the default handling of transactions. In one embodiment, attributes field 1304 includes priority field 1312, reserved field 1314, ordering field 1316, and no-snoop field 1318. Here, priority sub-field 1312 may be modified by an initiator to assign a priority to the transaction. Reserved attribute field 1314 is left reserved for future, or vendor-defined usage. Possible usage models using priority or security attributes may be implemented using the reserved attribute field.

In this example, ordering attribute field 1316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1318 is utilized to determine if transactions are snooped. As shown, channel ID Field 1306 identifies a channel that a transaction is associated with.

Link Layer

Link layer 1210, also referred to as data link layer 1210, acts as an intermediate stage between transaction layer 1205 and the physical layer 1220. In one embodiment, a responsibility of the data link layer 1210 is providing a reliable mechanism for exchanging Transaction Layer Packets (TLPs) between two components a link. One side of the Data Link Layer 1210 accepts TLPs assembled by the Transaction Layer 1205, applies packet sequence identifier 1211, i.e. an identification number or packet number, calculates and applies an error detection code, i.e. CRC 1212, and submits the modified TLPs to the Physical Layer 1220 for transmission across a physical to an external device.

Physical Layer

In one embodiment, physical layer 1220 includes logical sub block 1221 and electrical sub-block 1222 to physically transmit a packet to an external device. Here, logical sub-block 1221 is responsible for the "digital" functions of Physical Layer 1221. In this regard, the logical sub-block includes a transmit section to prepare outgoing information for transmission by physical sub-block 1222, and a receiver section to identify and prepare received information before passing it to the Link Layer 1210.

Physical block 1222 includes a transmitter and a receiver. The transmitter is supplied by logical sub-block 1221 with symbols, which the transmitter serializes and transmits onto to an external device. The receiver is supplied with serialized symbols from an external device and transforms the received signals into a bit-stream. The bit-stream is de-serialized and supplied to logical sub-block 1221. In one embodiment, an 8b/10b transmission code is employed, where ten-bit symbols are transmitted/received. Here, special symbols are used to frame a packet with frames 1223. In addition, in one example, the receiver also provides a symbol clock recovered from the incoming serial stream.

As stated above, although transaction layer 1205, link layer 1210, and physical layer 1220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 14:
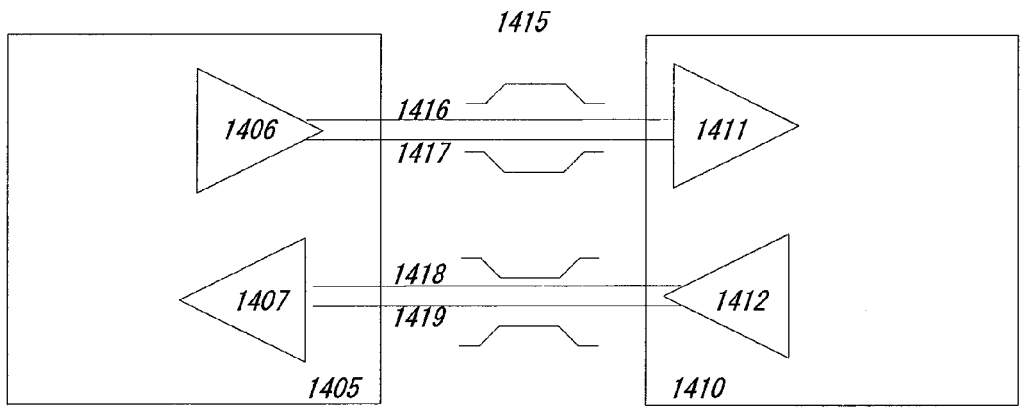
FIG. 14 illustrates an embodiment of a transmitter and receiver pair for a PCIe compliant interconnect architecture.

Referring next to FIG. 14, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1406/1411 and a receive pair 1412/1407. Accordingly, device 1405 includes transmission logic 1406 to transmit data to device 1410 and receiving logic 1407 to receive data from device 1410. In other words, two transmitting paths, i.e. paths 1416 and 1417, and two receiving paths, i.e. paths 1418 and 1419, are included in a PCIe link.

A transmission path refers to any path for transmitting data, such as a transmission line, a copper line, an optical line, a wireless communication channel, an infrared communication link, or other communication path. A connection between two devices, such as device 1405 and device 1410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

As discussed above, the Management Component Transport Protocol (MCTP) is a protocol being utilized to define how MCTP packets may be sent over a PCI Express (PCIe) bus. MCTP is independent of the underlying physical bus properties and the "data-link" layer messaging used on the bus. The physical and data-link layer methods for MCTP communication across a given medium are defined by companion "transport binding" specifications, such as MCTP over PCIe Vendor Defined Messaging (VDM) and MCTP over system management bus (SMBus) or $I^2C$. This approach enables future transport bindings to be defined to support additional buses such as universal serial bus (USB), Reduced Media Independent Interface (RMII), and others, without affecting the base MCTP specification. Various specifications relating to MCTP including the MCTP base specification are published by DMTF.

When transported over a PCIe bus, MCTP packets take the form of a vendor defined message (VDM), and this kind of implementation is often referred to as MCTP over PCIe. Implementation details for MCTP over PCIe are defined by "MCTP PCIe VDM Transport Binding Specification" authored by DMTF. This specification includes definitions for a packet format, physical address format, message routing, and discovery mechanisms for MCTP over PCIe VDM communications.

A PCIe root complex of a processor may route MCTP packets. A processor architecture supporting MCTP over PCIe includes various facilities for routing of MCTP message packets in accordance with the MCTP base specification. The basic unit of data transfer in MCTP is the "MCTP packet." One or more MCTP packets are used to transfer an "MCTP message." The base MCPT protocol defines the common fields for MCTP packets and how they are used. This includes defining fields such as source and destination address fields, fields that identify which packets belong to a particular MCTP message, and fields that define what type of communication traffic is being carried in the MCTP message. The base protocol also defines the processes used for assembling MCTP messages, routing MCTP packets, and handling error conditions such as dropped or missing packets. MCTP messages may transport platform management information, which is referred to herein as platform management messages.

An MCTP endpoint is the function within a device that terminates the communication protocol of MCTP and handles MCTP control commands. MCTP uses a logical address called an endpoint ID (EID) for addressing and routing MCTP packets to and from endpoints. In MCTP, a bus is defined as an interconnect between platform components that share a common physical layer address space. As discussed in detail herein below, transmitting MCTP messages through bus segments, such as PCIe bus segments, is a challenge for MCTP over PCIe.

Each MCTP bus has a bus owner. Bus owners are responsible for assigning EIDs to any MCTP devices on that bus. A bus owner may also have additional media-specific responsibilities, such as device discovery and assignment of physical addresses. MCTP Bridges are devices that connect to two or more MCTP busses and are responsible for routing MCTP packets between those busses. A bridge will typically also be the bus owner for at least one of the busses to which it connects.

MCTP allows multiple bridges, busses, and bus owners to be interconnected to form an "MCTP network." Because bus owners are responsible for assigning EIDs to any devices that are on the bus that it owns, MCTP provides a mechanism that enables bus owners to be allocated a pool of endpoint IDs that can be assigned or allocated to other devices. The ultimate source of EIDs for the entire MCTP network comes from what is referred to as the "topmost bus owner." The bus owner is management engine (ME) in one embodiment.

MCTP packets may be routed based on their EIDs. MCTP bridges maintain a set of information referred to as the "routing table" that tracks the relationship between the physical addresses and bus with which an EID is associated. When an incoming packet is received, this information is used to route the packet to the appropriate bus. If the source and target busses use different physical media, the bridge translates the physical layer formatting of the packet as required by the target medium. The information in the routing table is also used for handling requests to resolve an EID into a physical address and to support a capability to query individual bridges and bus owners for their routing information. This latter capability provides a way to obtain a snapshot of the MCTP network's routing configuration. The MCTP bridging function forwards packets based on endpoint addressing information on a per packet basis. Otherwise, bridging does not interpret message content, or handle message type-specific protocol behavior for routed packets. Bridging does not do intermediate assembly or disassembly of routed packets. Message assembly and disassembly is handled solely by the destination and source endpoints, respectively.

The type of communication payload in an MCTP Message is identified by an enumeration called the "MCTP Message Type." MCTP is designed to be able to carry packets for multiple message types across a common communications medium. The MCTP base protocol specification includes definition of a message type for MCTP Control messages and message types that support vendor-defined MCTP messages. Different message types are identified by a message type field that is carried in the header of an MCTP message.

The Transport Binding specifications are documents that describe how MCTP is implemented on a particular physical medium. This includes the definition of MCTP packet formatting for the medium, source and destination physical addressing handling, physical layer data integrity, and medium-specific timing parameters.

Figure 1A:
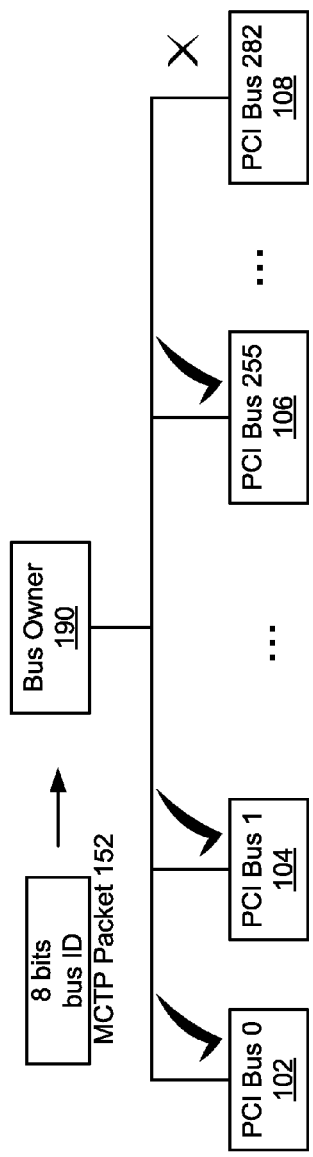
FIG. 1A illustrates a problem with supporting a large number of PCI busses.

FIG. 1A illustrates a problem with supporting a large number of PCI busses. In FIG. 1A, the computing system contains more than 256 PCIe bus numbers. PCI bus number 0, 1, 255, and 282 at references 102-108 respectively are assigned to certain end points of the computing system. Bus owner 190 (e.g., the BMC) controls MCTP packet routing. If bus number is used to route MCTP packet 152, an identification field of bus number needs more than eight bits long. Yet as will be discussed in more details below, MCTP packet VDM contains only eight bits for routing packets. Thus, a packet may be routed with bus numbers no higher than 256, and it cannot address PCI bus number 282 at reference 108 for example.

MCTP is being used in more and more computing systems, including larger server platforms. Some computing systems run out of addresses for supported PCI busses. They may run out of addresses for supported PCI busses before they run out of addresses for MCTP EIDs. The reasons for the disparity of address usages between PCI busses and EIDs are numerous, and several are enumerated below:

(1). A large number of PCI Express bus numbers are wasted because of alignment requirements. For example, some processor with Integrated PCI Express requires minimum of 32 busses per processors even though fewer PCI Express input/output (IO) devices may be attached to each processor.

(2). In PCI Express architecture, switches logically appear as two levels of PCI Bridges. This means at least one bus number is not available for endpoint use.

(3). Every PCI Express IO device will occupy a bus number, but may not be an MCTP endpoint.

(4). Technologies such as SR-IOV (Single Root IO Virtualization) require software to allocate more than one bus to a single endpoint.

(5) Hot plugging (or hot swapping) capable platforms, which allows replacing components of the platforms without shutting down the platforms, require software to over allocate bus numbers.

Indeed, there are four to eight socket server platforms now requiring more than 256 PCIe busses in order to map all IO devices. A single BMC may manage these kinds of platforms, which may include IO expansion chassis. The large number of PCIe busses may be segmented into PCIe bus segments. A PCIe bus segment is a logical grouping of PCIe busses. A segment shares a common physical space with other segments. Each PCIe bus segment may include up to 256 busses. Since a larger system/platform may have multiple PCIe bus segments, the multiple PCIe bus segments can address more than 256 busses the larger system/platform contains.

Figure 1B:
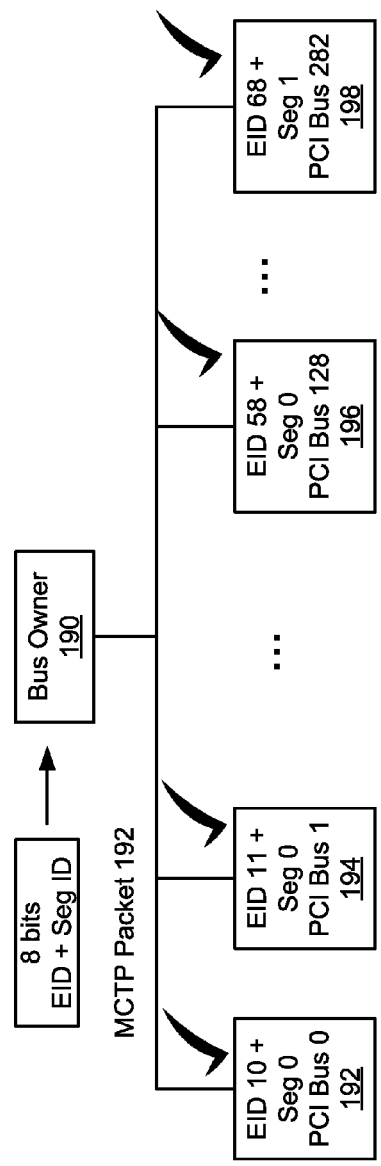
FIG. 1B illustrates a method of using segment identifier to support more than 256 PCIe busses according to one embodiment of the invention.

FIG. 1B illustrates a method of using segment identifier to support more than 256 PCIe busses according to one embodiment of the invention. In the computing system, In FIG. 1B, the computing system contains more than 256 PCIe bus numbers. Yet, each PCIe bus is assigned to a combination of endpoint ID (EID) and segment identifier and the combination of EID and segment identifier is used to route packet. In this example, PCIe bus 0 is identified by EID 10 and Segment 0 at reference 192, PCIe bus 1 is identified by EID 11 and Segment 0 at reference 194. Similarly, PCIe bus 128 is identified by EID 58 and Segment 0 at reference 196 and PCIe bus 282 is identified by EID 68 and Segment 1 at reference 198. When MCTP packet 192 is routed at bus owner 190, it may still use eight bits to identify PCIe buses, but it uses a combination of EID and segment identifier, and now it can address every PCIe bus, even the one at reference 198.

Figure 2A:
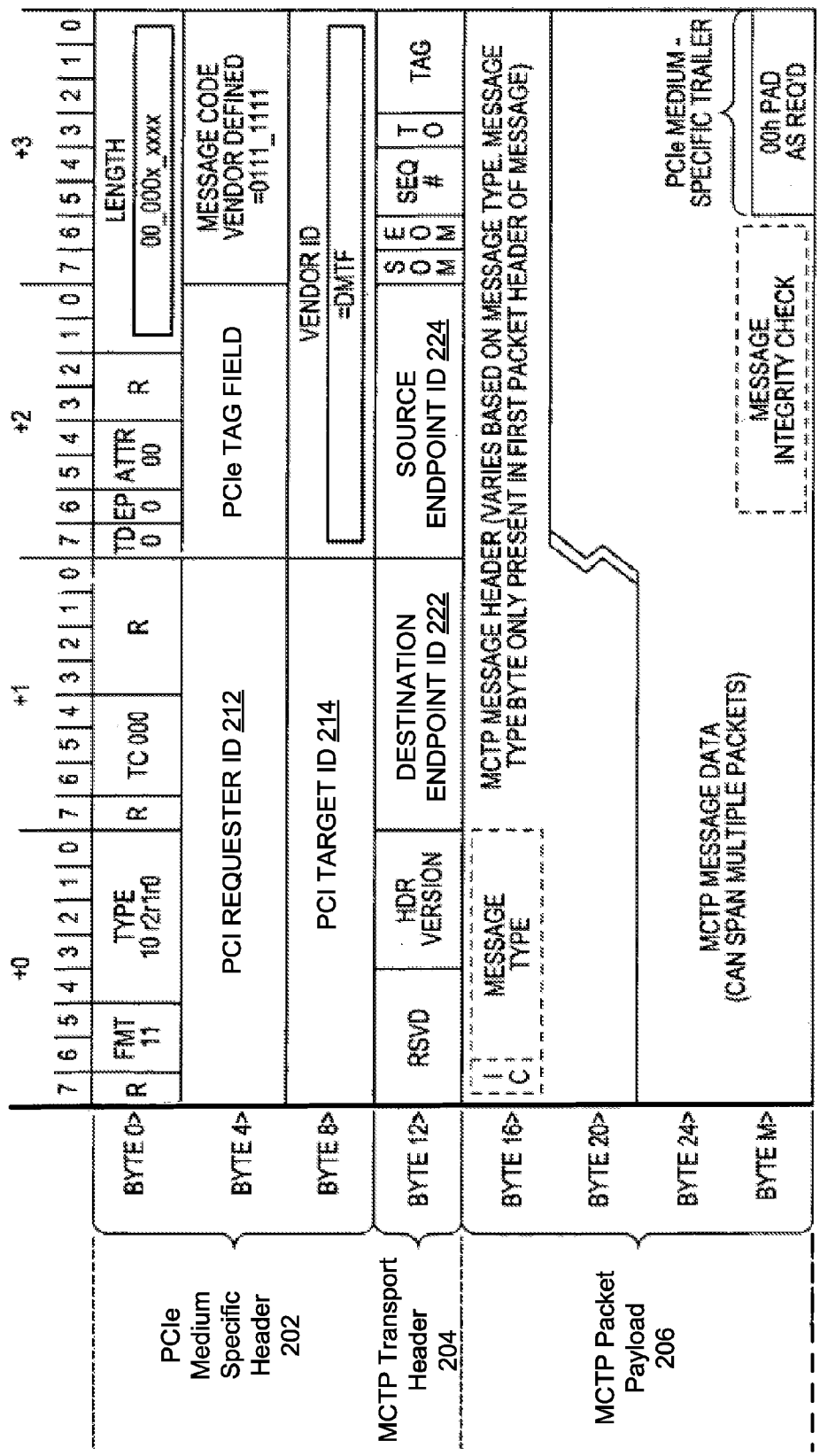
FIG. 2A is a block diagram illustrating an MCTP over PCIe packet format.

FIG. 2A is a block diagram illustrating an MCTP over PCIe packet format. The fields are specified for carrying MCTP packets using PCIe VDMs. The fields grouped by "MCTP Transport Header" at reference 204 and "MCTP Packet Payload" at reference 206 are common fields for all MCTP packets and messages and are specified by the MCTP Base Specification. The PCIe VDM header format is common for MCTP messages sent over PCIe. It includes various fields relating to basic MCTP message structure, as well as fields in which vendor-specific information can be entered.

The MCTP packet payload 206 begins at Byte 16 and can extend up to Byte 80, yielding a total payload of up to 64 bytes. This portion of the packet also corresponds to the PCIe VDM data. Of interest to discussing routing over PCIe bus segments, the PCIe VDM header contains two address fields. One is a physical address field at references 212 and 214, which includes a field for a PCI Requester ID (at reference 212) and a field for a PCI Target ID (at reference 214). The other is a logical address field at references 222 and 224, which includes a field for the destination EID (at reference 222) and a field for the source EID (at reference 224). Each of the address fields contains its own limitations as discussed below and thus can only address up to 256 entities.

For the physical address fields, MCTP VDMs use 8 bit Bus number, 5 bit Device number, and 3 bit Function number (as known as BDF) to specify the PCIe address of the requester as well as the target. Specifically, bytes 4-5 in the VDM illustrated in FIG. 2A hold the requestor BDF and bytes 8-9 hold the target BDF. Thus, a PCIe Express Root complex can route MCTP packet within 256 busses using the 8 bits ($2^8$=256 busses).

For the logical address fields at references 222 and 224, bytes 13 and 14 in the VDM illustrated in FIG. 2A carry the EID for the destination and the source respectively. Eight bit EID field limits an MCTP network to 256 end points. As discussed herein above, the EIDs are allocated by MCTP bus owner and EIDs may not bear any relationship to BDF. The management engine (ME) is designated as the MCTP bus owner in one embodiment and the bus owner maintains mapping between EID and BDF.

Thus, both physical address fields and logical address fields can only address up to 256 entities (the entities being busses and EIDs respectively). Yet, since PCIe VDMs do not contain a segment field, root complex implementations known in the art are unable to transport MCTP VDMs across PCIe bus segments. This can be a problem in multiple PCIe bus segment platforms since a PCIe bus segment number of a managed device (e.g., a network interface card (NIC)) is often different from the management controller (e.g., BMC or ME) segment number. Existing systems may address the issue in one of two ways:

(1). The MCTP specification has defined a MCTP bridge that can be used to route MCTP messages across PCIe bus segments. Yet, an MCTP bridge requires extra hardware controllers with complicated topology and is thus undesirable. For example, a BMC can be used as a bridge, but bridging MCTP across eight sockets or eight PCIe bus segment systems would require a BMC chip with eight PCIe ports, each being connected to a different socket. This kind of implementation is very expensive.

(2). The PCIe VDM definition may be changed to include a segment field. This approach would require MCTP endpoints to decode the segment field, where as presently PCIe endpoints are not aware of PCIe bus segments identifier. This approach may be a long term solution, but it would not work for legacy MCTP endpoints.

Similar problems may occur in multi-computer systems (e.g. microservers) where multiple nodes are managed as a single unit. These nodes communicate with each other during manageability operation (e.g., rebalancing power budget across nodes). Each node runs its own instance of operating system (OS) and its own instance of PCI bus enumerator. Inter-node MCTP communication cannot use BDF due to bus number aliasing, thus address exhaustion may lead to PCIe bus segments and the need to route across PCIe bus segments in multi-computer systems.

Figure 2B:
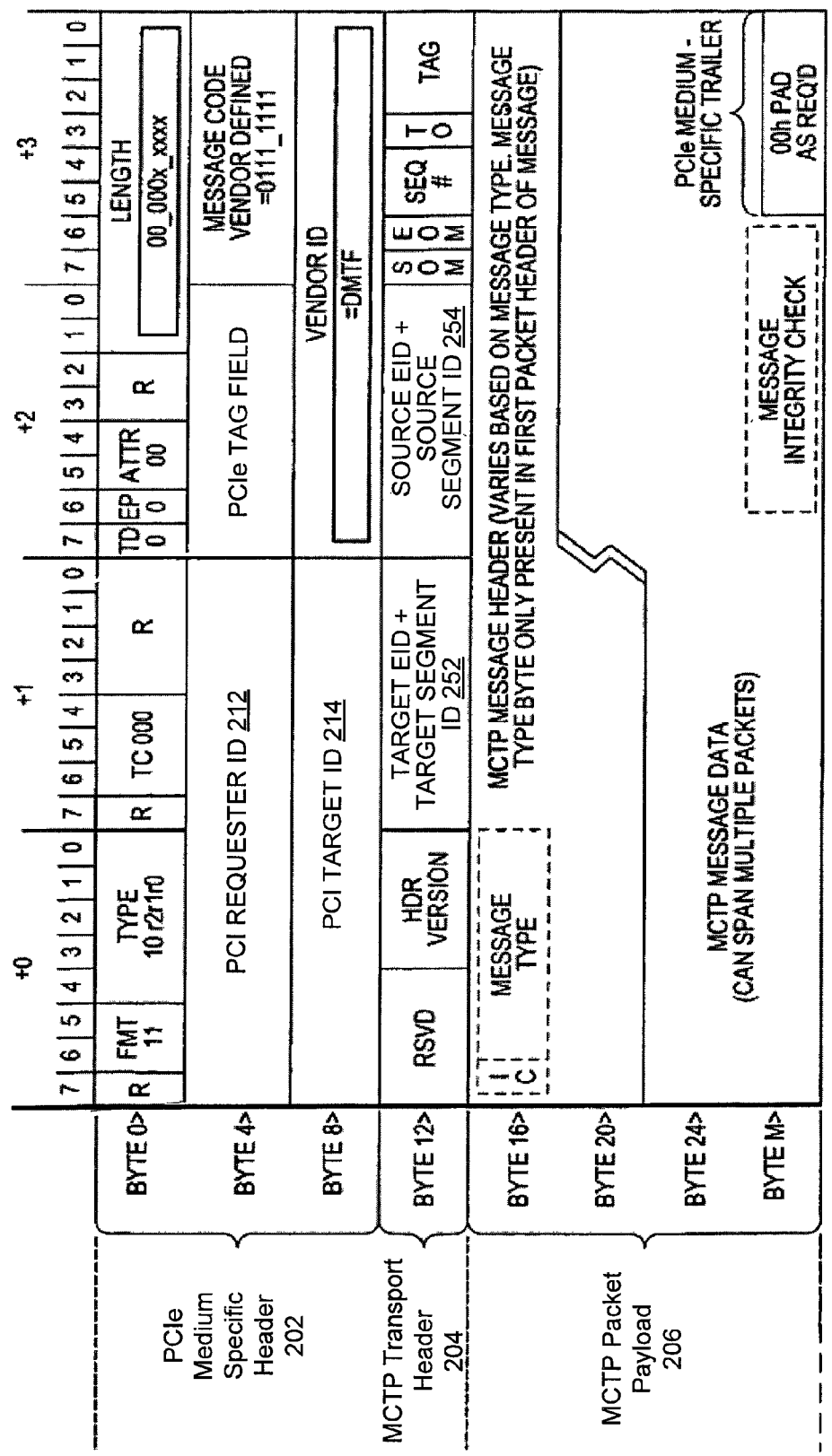
FIG. 2B illustrates an interpretation of endpoint identifier fields of an MCTP over PCIe packet format according to one embodiment of the invention.

FIG. 2B illustrates an interpretation of endpoint identifier fields of an MCTP over PCIe packet format according to one embodiment of the invention. The MCTP over PCIe packet format in FIG. 2B is similar to FIG. 2A and all fields may be construed or interpreted similarly except references 252 and 254 respectively. At reference 252, instead of indicating destination endpoint only as illustrated at reference 222 in FIG. 2A, the field now indicates both target endpoint and target segment identifier. Similarly, reference 254 indicates both source endpoint and source segment identifier.

Thus, a portion of the source and destination EID fields of an MCTP over PCIe packet is utilized to identify the source PCIe bus segment and the destination PCIe bus segment respectively in one embodiment. Each PCIe bus segment has a different range of endpoint identifiers, and each range of endpoint identifiers is less than 256. However, the bus identifier in each PCIe bus segment may still have the full range of 256. For example, for a processor with only two PCIe bus segments, a single bit in EID field may be used to identify a PCIe bus segment. The following table illustrates the ranges of bus numbers and EID numbers with the highest bit of EID field being utilized to identify PCIe bus segments.

TABLE 1

PCIe bus segment and Bus/EID ranges

| PCIe bus segments and Bus Number Ranges | EID Range allocated to MCTP endpoints |
|---|---|
| Segment 0, bus 0-255 | 0-127 |
| Segment 1, bus 0-255 | 128-255 |

In other embodiments, more bits in the EID fields may be utilized to identify PCIe bus segments. For example, two, three, four bits, five bits, or even more bits within EID fields may be utilized to identify PCIe bus segments. In addition, the one or more bits for PCIe bus segment identification do not need to be the upper bits, or lower bits. They may be defined by the processor/system/platform as it desires. Indeed, the bits for PCIe bus segment identification may not be next to each other. However, the more EID fields being utilized for PCIe bus segment identification, the less MCTP endpoints each segment can address. As discussed above herein, in many cases a system runs out of PCIe bus numbers before it runs out of MCTP endpoints. In these cases, utilizing EID fields for PCIe bus segment identification in addition to MCTP endpoint identification is an efficient way to route MCTP packet across multiple segments.

Figure 3:
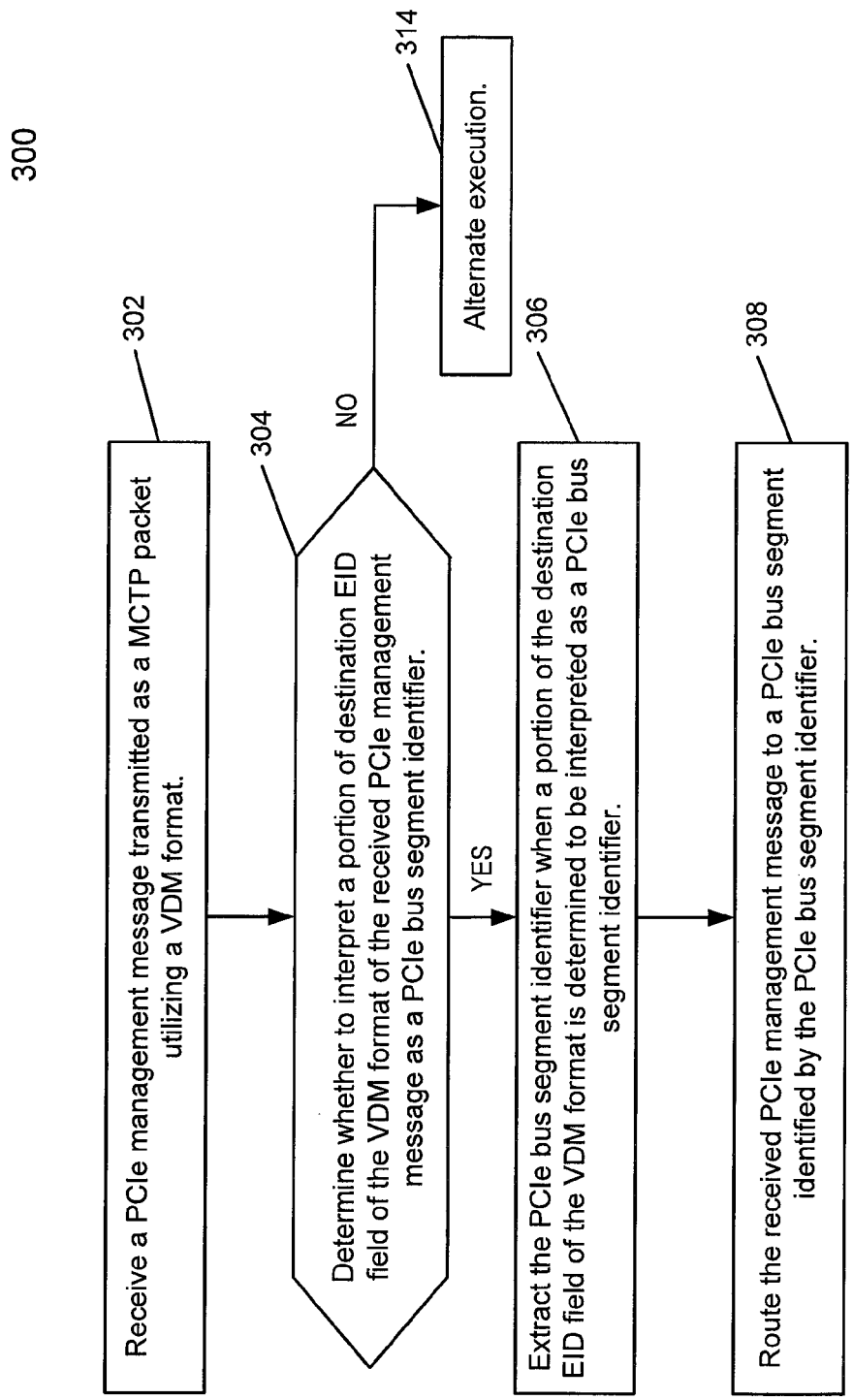
FIG. 3 is a flow diagram illustrating an implementation of routing MCTP packets across multiple segments according to one embodiment of the invention.

FIG. 3 is a flow diagram illustrating an implementation of routing MCTP packets across multiple segments according to one embodiment of the invention. The operations of FIG. 3 may be implemented by a processor uncore (uncore often refers to elements in a processor die that are not computing engines) of a computing system. For example, the operations of FIG. 3 may be implemented in a root complex.

The operations begin at operation 302, where a PCIe management message is received at a root complex. The PCIe management message is transmitted as a MCTP packet and utilizes an embodiment of a VDM format. Flow moves from operation 302 to operation 304, where the root complex determines whether to interpret a portion of destination EID field of the VDM format of the received PCIe management message as a PCIe bus segment. The determination may be based on a setting within a basic input/out system (BIOS) of the computing system in one embodiment. The setting within the BIOS may further indicate which portion of the EID fields (e.g., which bits within the EID field) is to be interpreted as a PCIe bus segment identifier. If root complex determines not to interpret destination EID field as a PCIe bus segment identifier, the flow moves to operation 314 to perform an alternate execution. As the prior art already discloses routing MCTP packet with destination EID field, the detail of the alternate execution is outside of the scope of this specification.

If root complex determines to interpret destination EID field as a PCIe bus segment identifier, flow moves from operation 304 to operation 306, where root complex extracts the PCIe bus segment identifier from the destination EID field. In one embodiment, a setting within the BIOS of the computing system determines the bits to be extracted. In another embodiment, the bits to be extracted is predetermined (i.e., by default) without requiring a setting within the BIOS. Flow then moves to operation 308, where root complex routes the received PCIe management message to a PCIe bus segment identified by the PCIe bus segment identifier. In one embodiment, for routing the PCIe management message, the root complex compares a value stored in a register that indicates a segment identifier value of the present PCIe bus segment. If the bits extracted from the portion of the destination EID field for destination PCIe bus segment identifier contain the same value as the value in the register, the received PCIe management message will be routed within the present PCIe bus segment. Otherwise, the message is routed to a different PCIe bus segment.

Note that a source segment ID may be inserted in the EID field when the PCIe management message is packetized. In a system with multiple processors, the creation of the PCIe management message with source segment ID insertion may be performed by another processor. The computing system may route across multiple PCIe bus segments as long as elements of the computing system agree on the particular bit positions being reserved for source segment ID in the source EID field and the particular bit positions being reserved for target segment ID in the VDM format.

Also note that the insertion and interpretation of a portion of EID fields as PCIe bus segment identifier may be turned off. For example, a setting in a BIOS may indicate whether to insert PCIe bus segment identifier in the source EID field upon creating a MCTP packet and/or interpret a portion of target EID field as a target PCIe bus segment identifier.

Figure 4:
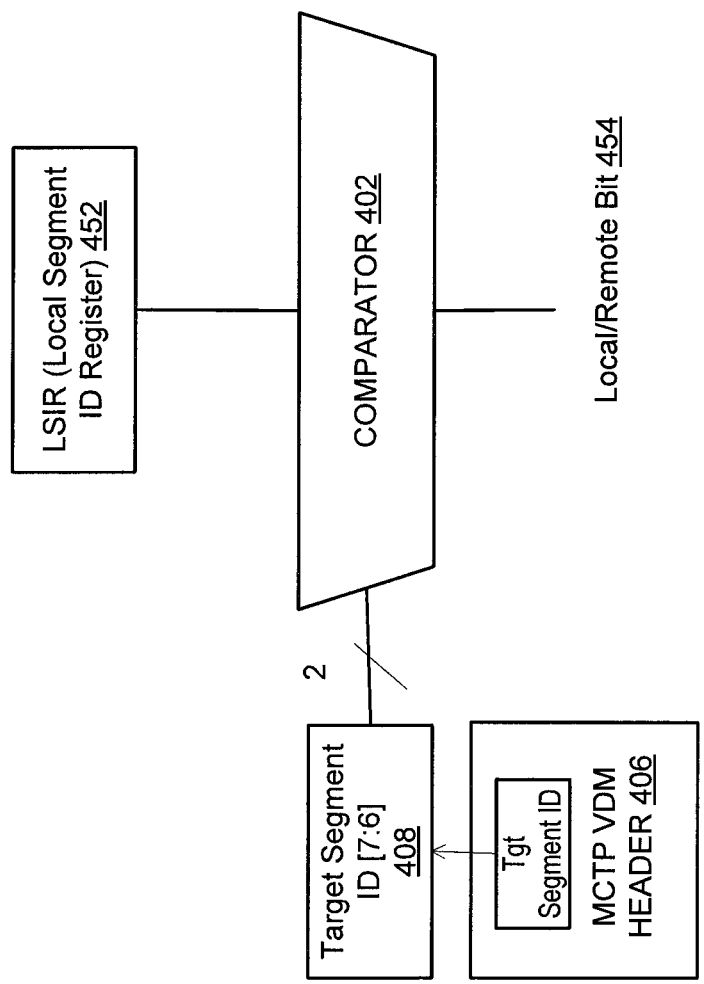
FIG. 4 is a block diagram illustrating an implementation of matching extracted target segment identifier to local segment identifier in a computing system according to one embodiment of the invention.

At a root complex, routing of an MCTP packet can be done in a variety of ways. In one embodiment, matching target segment identifier of an MCTP packet with local segment identifier is performed. FIG. 4 is a block diagram illustrating an implementation of matching extracted target segment identifier to local segment identifier in a computing system according to one embodiment of the invention. The comparison and finding match may be referred to as target segment identifier lookup. In one embodiment, the lookup is performed through a lookup table that is stored in a processor uncore and is configured by the BIOS of the computing system.

A comparator at reference 402 is utilized for target segment identifier lookup. In one embodiment, comparator 402 receives a value from a local segment identifier register (LSIR) 452. Comparator 402 receives a target segment identifier from the target segment register 408. The single lines between target segment ID entities and comparator 402 represents two line connections, which symbolized by number 2 adjacent to each single lines. All single lines tagged with a number symbolize the number of physical connections for the single lines in figures of this specification unless noted otherwise. In this embodiment, the highest two bits, bits 6 and 7 (denoted with [7:6] at target segment ID 408) represent the target segment ID of a received MCTP packet. The target segment ID register extracts the PCIe target segment ID of the received MCTP packet from the MCTP VDM header 406. The comparator 402 compares the extracted bits with the value in LSIR 452. The comparator 402 then determines whether this MCTP VDM is meant for the local socket. If the MCTP VDM is meant for local socket, it will be sent to PCI express ports of the local socket. Otherwise, it will get sent to Target Node ID lookup process shown in FIG. 6. Note depending on the number of PCIe bus segments the computing system contains, more or less bits may be extracted from MCTP VDM headers of received MCTP management messages.

The implementation in FIG. 4 may be implemented in a computing system with a single processor that includes more than 256 PCIe busses, and a number of PCIe bus segments are thus utilized to manage all applicable devices on these PCIe busses.

In some embodiments, a computing system contains multiple processors. The multiple processors are coupled together through a point-to-point processor interconnect. For example, processors and their associated processor sockets may be coupled together through an Intel® QuickPath Interconnect (QPI), a common system interface (CSI), or any other specially designed interconnects. For a computing system with multiple processors, prior art has disclosed methods to route MCTP over PCIe messages over point-to-point processor interconnects. For example, tunneling MCTP packets over QPI is disclosed in a non-provisional U.S. patent application Ser. No. 13/532,085, entitled "Tunneling Platform Management Messages Through Inter-processor Interconnects," by Luke Chang, Mahesh Natu, James R. Vash, Michelle M. Sebot, and Robert J Safranek, filed on Jun. 25, 2012. In a computing system implementing tunneling MCTP packet over QPI, the computing system may use a portion of the PCI request field to look up a target QPI processor node ID. Then the BIOS of the computing system configures the MCTP source address decoder (SAD) while it allocates a PCI bus number to a processor socket. Thus, MCTP packets may be tunneled to the target QPI processor. However, the tunneling MCTP packet disregards routing across PCIe bus segments.

Figure 5:
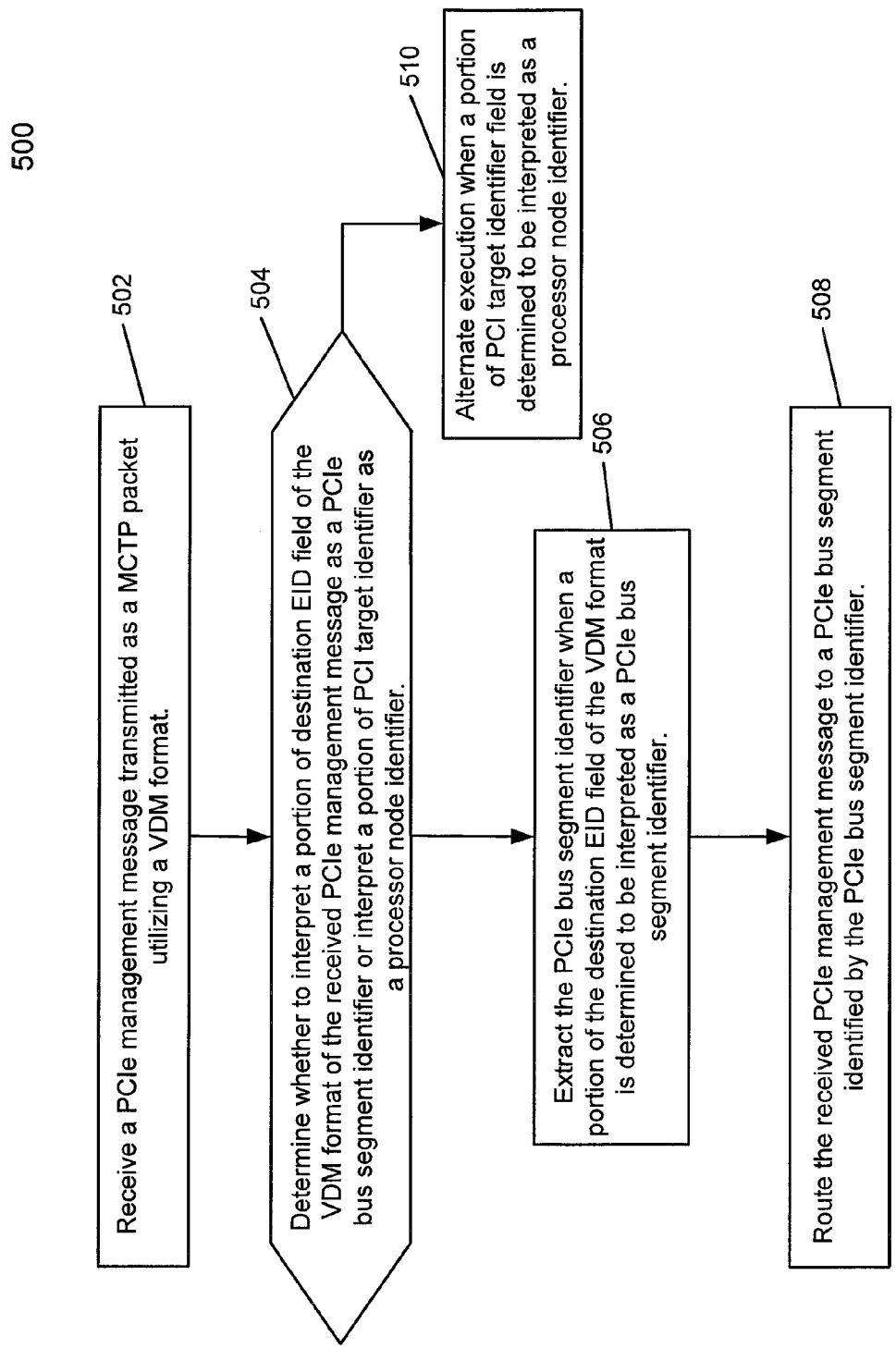
FIG. 5 is another flow diagram illustrating a method of utilizing MCTP packet to route message across multiple segments according to one embodiment of the invention.

FIG. 5 is another flow diagram illustrating an implementation of matching extracted target segment identifier to local segment identifier in a computing system according to one embodiment of the invention. Root complex considers routing MCTP packets within a system with multiple PCIe bus segments and multiple processor nodes/sockets.

Method 500 starts at operation 502, where a PCIe management message is received. The PCIe management message is transmitted as a MCTP packet, and the MCTP packet utilizes an embodiment of a VDM format. Then at reference 504, the root complex determines whether to interpret a portion of destination EID field of the VDM format of the received PCIe management message as a PCIe bus segment, or interpret a portion of the PCI target identifier field of the received PCIe management message within a VDM format as a processor node identifier.

The determination may be based on a setting within a basic input/out system (BIOS) of the computing system in one embodiment. The setting within the BIOS may further indicate which portion of the EID fields is to be interpreted as a PCIe bus segment identifier. In addition, when a portion of the PCI target identifier field is to be interpreted as a processor node identifier, the setting may indicate the portion of the PCI target identifier field to be interpreted. When it is determined that a portion of PCI target identifier field is to be interpreted as a processor node identifier, an alternate execution is performed at operation 510. As discussed herein above, the alternate execution is known in the art.

When a portion of destination EID field of the VDM format is determined to be interpreted as a PCIe bus segment identifier, the PCIe bus segment identifier is extracted from the destination EID field at operation 506. In one embodiment, a setting within the BIOS of the computing system determines the bits to be extracted. In another embodiment, the bits to be extracted are predetermined (i.e., by default) without requiring a setting within the BIOS. Then at reference 508, the received PCIe management message is routed to a PCIe bus segment identified by the PCIe bus segment identifier. In one embodiment, for routing the PCIe management message, the method compares a value stored in a register, and the value indicates a segment identifier value of the present PCIe bus segment. If the bits extracted from the portion of the destination EID field for destination PCIe bus segment identifier contain the same value as the value in the register, the received PCIe management message will be routed within the present PCIe bus segment. Otherwise, the message is routed to a different PCIe bus segment.

Figure 6:
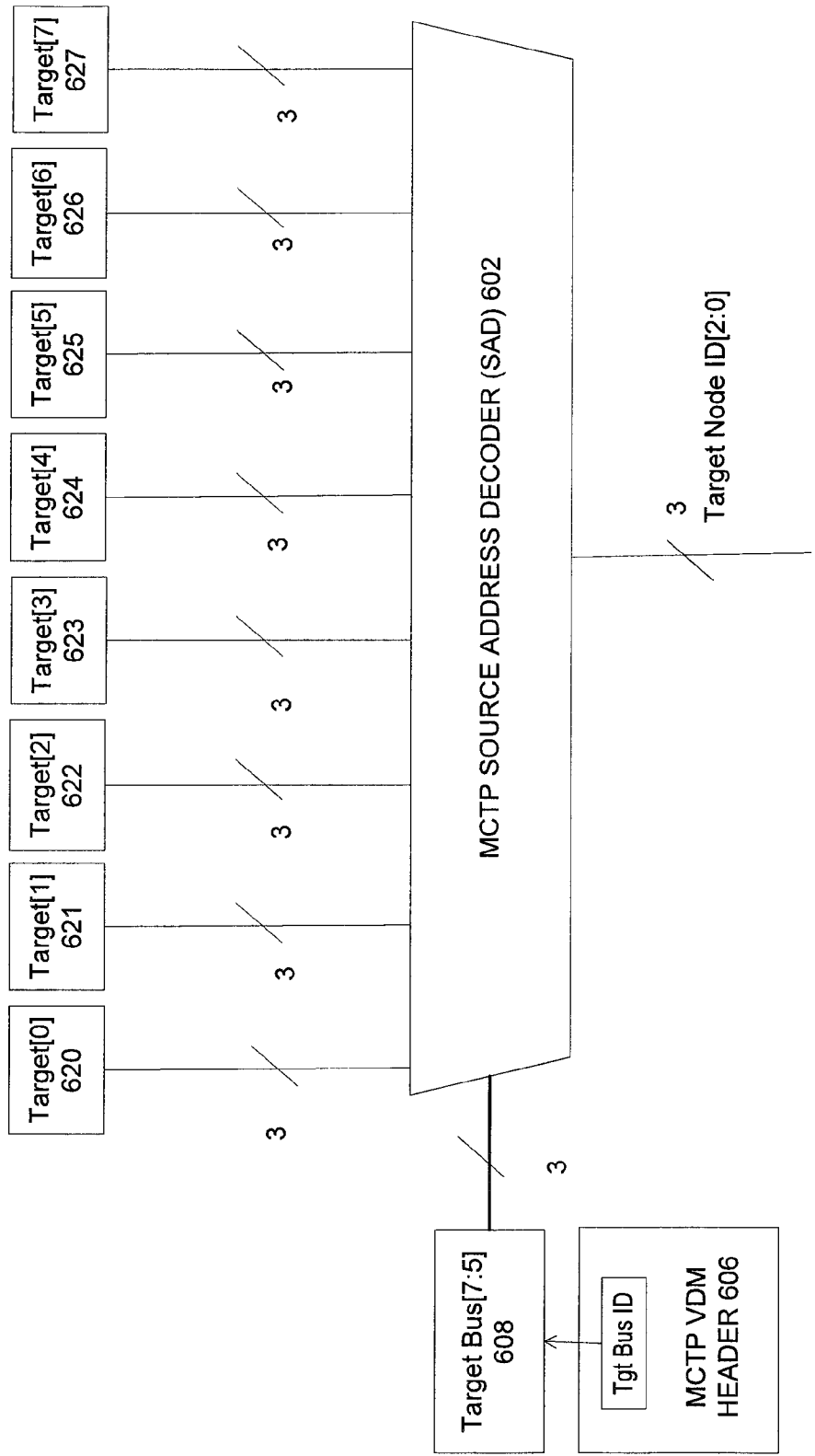
FIG. 6 is a block diagram illustrating an implementation of routing MCTP packets through matching extracted target bus identifier in a computing system with multiple processor nodes according to one embodiment.

FIG. 6 is a block diagram illustrating an implementation of routing MCTP packets through matching extracted target bus identifier in a computing system with multiple processor nodes according to one embodiment. As there are more than one processor nodes, a target node identifier lookup is needed. The target node identifier entities contain eight target identifier registers 620-627 storing target identifier values targets [0]-[7] respectively. The target identifier registers may be configured by the BIOS of the computing system. A received MCTP packet contains the MCTP VDM header 606, from which a target bus identifier may be extracted. A target bus ID is extracted and stored in a target bus register 608. In this embodiment, three upper bits (bits 7:5) are used to indicate the target bus identifier, the upper bits are denoted as [7:5] at target bus 608. Thus, the values in bits 7:5 are extracted and stored in the target bus register 608. Then the BIOS of the computing system may configure MCTP SAD 602 to allocate PCI bus numbers to processor/socket node. The MCTP SAD 602 consults bits 7:5 of the target bus number field stored in the target bus register 608 as the index to look up the node identifier of the target.

Figure 7:
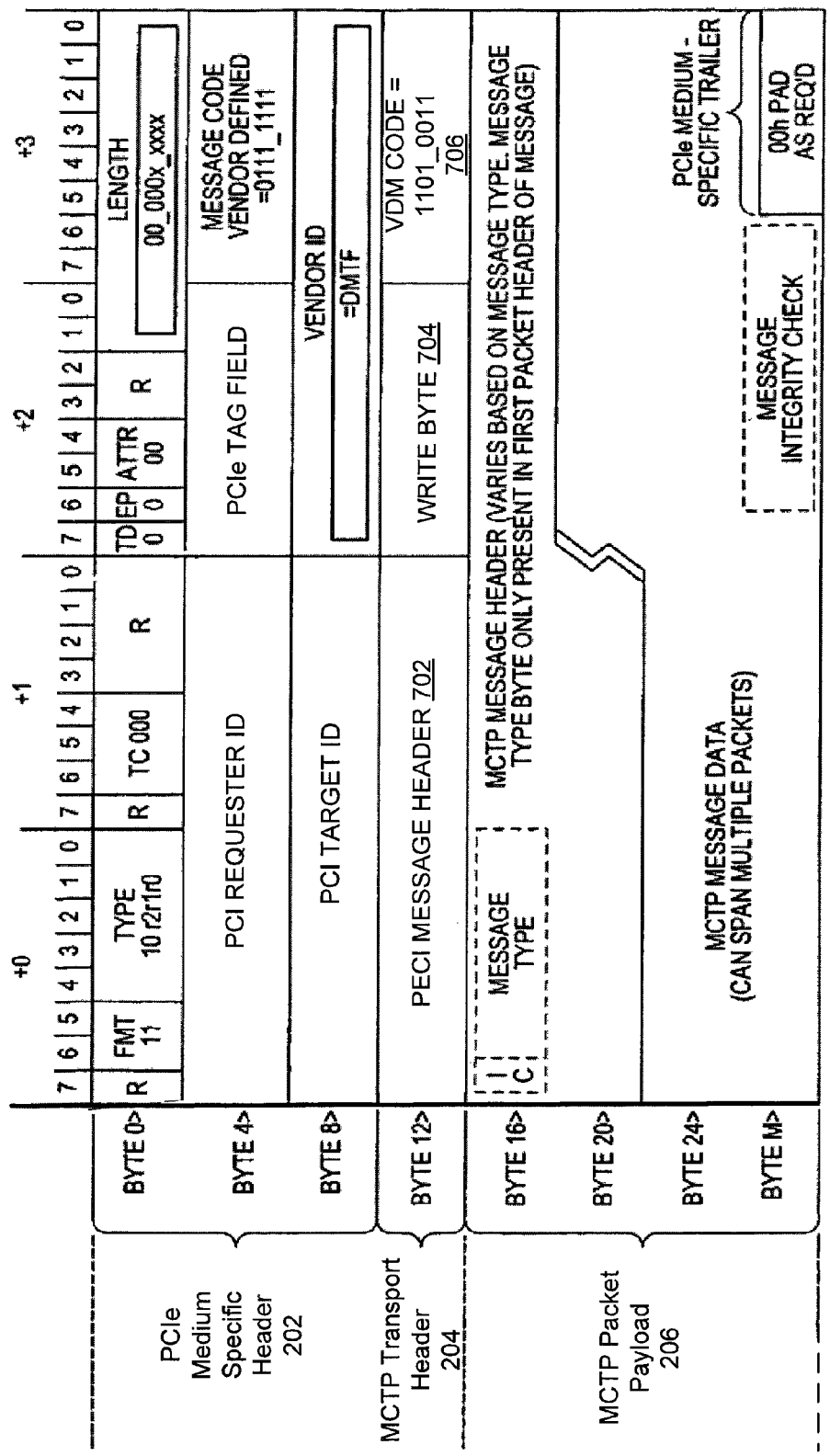
FIG. 7 is a block diagram illustrating an MCTP over PCIe packet format with multi-process node support according to one embodiment.

FIG. 7 is a block diagram illustrating another PCIe VDM packet format with multi-processor node support according to one embodiment. This format does not comply with MCTP, but can use the mechanisms described in previous paragraphs to route it across processors. This embodiment illustrates a field mapping between VDM headers and QPI tunnel packet headers. The details of the mapping are beyond the scope of this specification. In FIG. 7, byte 12 has been utilized different than what illustrated in FIG. 2. PECI message header 702, write byte 704, and VDM code specific to the VDM format 706 are now taking bytes 12-15. However, as discussed above herein, prior art has not disclosed a way to identify PCIe bus segment of a MCTP packet. This embodiment illustrates that while VDM packet routing across multiple processor node has been considered, these multiple processor node needs to be in the same PCIe bus segment, which can be a limitation when more than 256 managed devices are coupled to the computing system.

Figure 8:
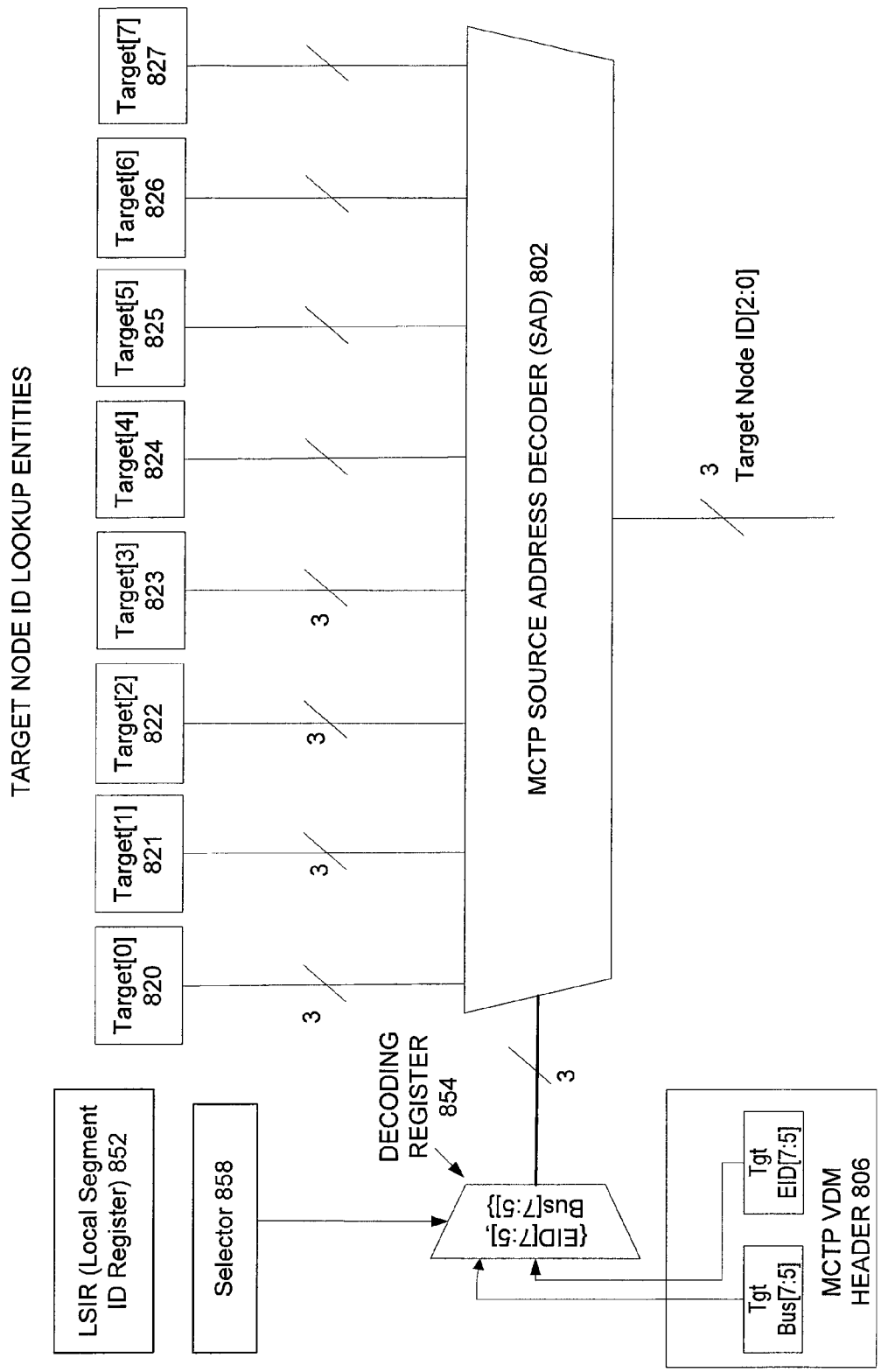
FIG. 8 is a block diagram illustrating an implementation of routing MCTP packets in a computing system with multiple processor nodes and multiple PCIe bus segments according to one embodiment of the invention.

FIG. 8 is a block diagram illustrating an implementation of routing MCTP packets in a computing system with multiple processor nodes and multiple PCIe bus segments according to one embodiment of the invention. FIG. 8 is similar to FIG. 6 and the same or similar references indicate elements or components having the same or similar functionalities. The differences between FIG. 8 and FIG. 6 are discussed herein below. Although the embodiment of FIG. 6 describes extracting only the target bus identifier field bits 7:5, in the embodiment of FIG. 8, both the target bus identifier field bits 7:5 and the target EID field bits 7:5 are extracted. In this embodiment, these three high bits of target EID field are utilized for the target PCIe bus segment identifier. The extracted bits are stored in decoding register 854. In this embodiment, the decoding register 854 contains six bits for a given MCTP packet: three bits for target bus identifier and three bits for target segment identifier (extracted from the target EID field). Selector 858 is to select either the three bits for the target bus identifier or the three bits for the target segment identifier that is utilized by the MCTP source address decoder (SAD) 802. The setting of selector 858 may be configured by the BIOS of the computing system. The computing system further includes local segment identifier register 852 to store the local PCIe bus segment identifier for identify local segment.

When the selector 858 selects a segment identifier from the decoding register 854, MCTP SAD 802 looks the target segment for the received MCTP packet. As a result, the MCTP packet may route across multiple PCIe bus segments. When the selector 858 selects a target bus identifier from the decoding register 854, MCTP SAD 802 looks up target processor/socket node identifier for the received MCTP packet in a similar way as described with reference to FIG. 6.

Note that FIG. 8 illustrates that the same number of bits are extracted from the target bus identifier field and the target EID field. In other embodiments, different numbers of bits may be extracted from the target bus identifier field and the target EID field. For example, a computing system may take 3 bits from the target EID field since there are up to eight PCIe bus segments while the computing system takes only two bits from the target bus identifier field when multiple PCIe bus segments are not configured.

The PCI segment and bus numbers may be allocated by the bus enumerator of the computing system. MCTP bus owner may allocate EIDs such that it can take advantage of the logic described FIG. 8. The allocation may be dependent on managed devices coupled with each processor node and segment. Table 2 illustrates one allocation of ranges for PCIe bus number and EID ranges attached to a given processor.

TABLE 2

PCIe bus segment and Bus/EID Biased Distribution with Multiple Processors

| Node ID | PCI Segment and bus numbers decoded by processor | EID range allocated to MCTP endpoints attached | Local Seg. No. (LSN) |
|---|---|---|---|
| 0 | Segment 0, bus 0-127 | 0-31 | 0 |
| 1 | Segment 0, bus 128-255 | 32-63 | 0 |
| 2 | Segment 1, bus 0-127 | 64-95 | 1 |
| 3 | Absent | NA | NA |
| 4 | Segment 1, bus 128-255 | 96-127 | 1 |
| 5 | Segment 2, bus 0-255 | 128-191 | 2 |
| 6 | Segment 3, bus 0-127 | 160-191 | 3 |
| 6 | Segment 3, bus 128-255 | 214-255 | 3 |

Node ID 5 has more input/output attached and 256 busses are allocated to it. With larger number of busses, the EID pool is also bigger at 64. In some embodiments, node ID 0 may get a larger EID pool since node ID 0 represents processor socket 0 which handles EIDs for MCTP over SMBus endpoints.

Table 3 illustrates a simpler allocation in a system with four processors and four PCIe bus segments. EIDs are equally divided among the four sockets in this case.

TABLE 3

PCIe bus segment and Bus/EID Evenly Distribution with Multiple Processors

| Node ID | PCI Segment and bus numbers decoded by processor | EID range allocated to MCTP endpoints attached | Local Seg. No. (LSN) |
|---|---|---|---|
| 0 | Segment 0, bus 0-255 | 0-63 | 0 |
| 1 | Segment 1, bus 0-255 | 64-127 | 1 |
| 2 | Segment 1, bus 0-255 | 128-191 | 2 |
| 3 | Segment 1, bus 0-255 | 192-255 | 3 |

Figure 9:
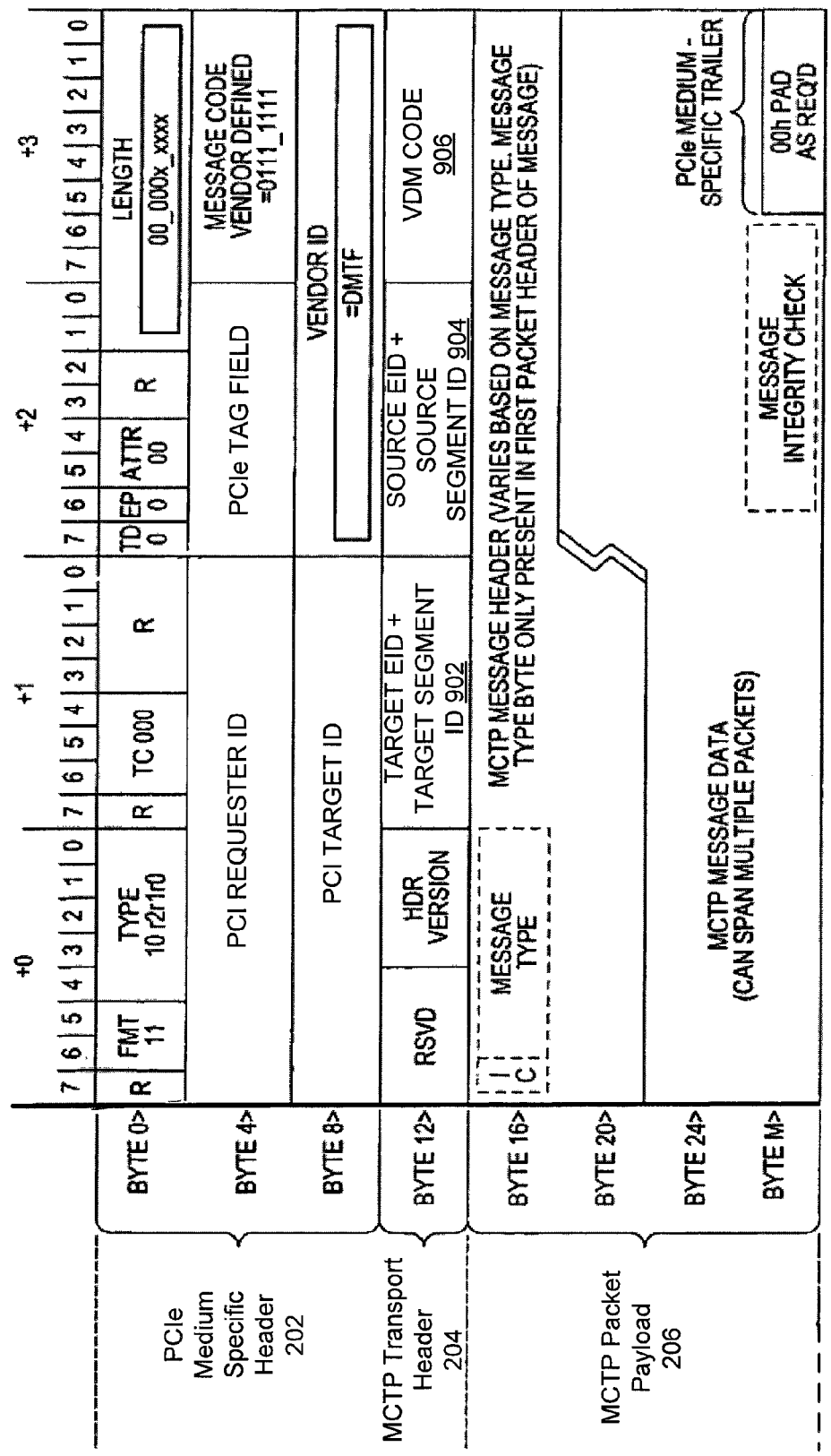
FIG. 9 is a block diagram illustrating an MCTP over PCIe packet format with multi-process node and multiple PCIe bus segment support according to one embodiment of the invention.

FIG. 9 is a block diagram illustrating an MCTP over PCIe packet format with multi-processor node and multiple PCIe bus segment support according to one embodiment of the invention. FIG. 9 is similar to FIG. 7. Yet FIG. 7 represents a PCIe VDM format adapted for multiple processor nodes without considering multiple PCIe bus segment support. Thus in FIG. 9, target endpoint identifier plus target PCIe bus segment identifier 902 are inserted in bytes 13 and source endpoint identifier plus source PCIe bus segment identifier 904 are inserted in byte 14. VDM code 906 may indicate a different format code. In one embodiment, other fields are also updated. For example, the header of the MCTP packet may embed a code indicating that EID fields embed PCIe bus segment identifiers.

Figure 10:
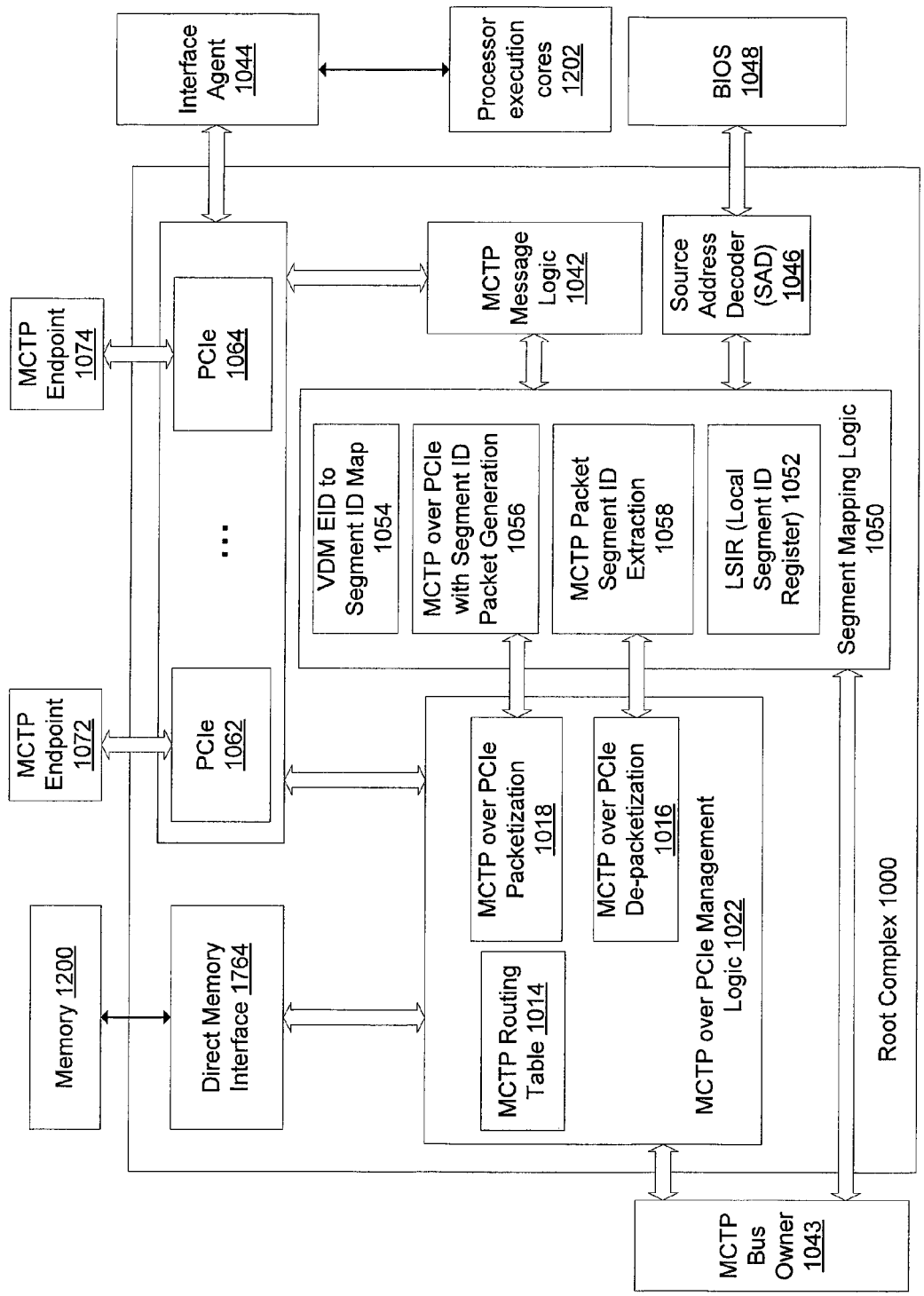
FIG. 10 is a block diagram illustrating a root complex of a computing system incorporating a method of routing MCTP packets across multiple PCIe bus segments according to one embodiment of the invention.

FIG. 10 is a block diagram illustrating a root complex of a computing system incorporating a method of routing MCTP packets across multiple PCIe bus segments according to one embodiment of the invention. Root complex 1000 interacts with memory 1200, MCTP endpoints 1072-1074, Interface agent 1044, MCTP bus owner 1043 and BIOS 1048. In some embodiment, root complex 1000 is integrated within a processor as an uncore component. Root complex 1000 interacts with processors through interface agent 1044. In some embodiment, integrated input/out (IIO) is utilized integrating interface agent 1044 functionality. Root complex 1000 interacts with a MCTP bus owner 1043, interface agent 1044, and BIOS 1048 for routing MCTP packets. Root complex 1000 contains a number of PCIe bus Root ports at references 1062-1064. The MCTP endpoints at reference 1072-1074 are attached to the Root ports. In some embodiment, root complex 1000 may contain more than 256 PCIe busses, in which case these busses need to be categorized into different PCIe bus segments. Root complex 1000 may categorize PCIe busses into different PCIe bus segments when PCIe bus count is less than 256 for example for management efficiency.

MCTP Message logic 1042 receives and transmits MCTP packets. The MCTP packets may contain PCIe management messages and these PCIe management messages are to be routed across multiple PCIe bus segments. Segment mapping logic 1050 may be configured to process received MCTP packets and MCTP packets to be transmitted. Segment mapping logic 1050 contains local segment identifier register (LSIR) 1052 which stores local segment identifier. LSIR may be stored outside of segment mapping logic 1050 in some embodiment. Segment mapping logic 1050 also contains MCTP over PCIe with segment ID packet generation logic 1056 and MTCP packet segment identifier extraction logic 1058. The two logics perform opposite tasks of inserting PCIe bus segment identifier to a MCTP packet to be generated and extracting PCIe bus segment identifier from a received MCTP packet respectively. VDM EID to segment ID map 1054 stores a mapping between segment ID and VDM EIDs. For example, the range of EID for MCTP packets may be stored. The Segment mapping logic can also insert the local segment number value in the appropriate bits in the target EID field of MCTP VDMs it receives from MCTP endpoints. This helps bus owner distinguish the source of messages during MCTP enumeration phase when the bus owner has not yet assigned endpoint IDs.

Segment mapping logic 1050 may be communicatively coupled with source address decoder (SAD) logic 1046, BIOS 1048, and MCTP bus owner 1043. SAD logic 1046 can utilize either target identifier field or target EID field for processor node or PCIe bus segment lookup respectively. A selector of the choices may be a setting stored in SAD logic 1046 and programmed by BIOS 1048. BIOS 1048 may configure SAD logic 1046 and also LSIR 1052. In addition, BIOS 1048 may communicate the mapping between segment number and processor node ID to MCTP bus owner 1043. MCTP bus owner 1043 is configured to allocate endpoint IDs such that certain EID bits match the PCIe bus segment number of the endpoint. The distribution may be performed such that the number of EIDs available to a processor/socket is proportional to the number of busses allocated to the processor/socket.

Segment mapping logic 1050 is communicatively couple with MCTP over PCIe management logic 1022. MCTP over PCIe management logic 1022 contains MCTP over PCIe packetization logic 1018 and MCTP over PCIe de-packetization logic 1016. At MCTP over PCIe packetization logic 1018, MCTP packets are generated with packetization information other than provided by segment mapping logic 1050. For example, processor/socket node information may be inserted. At MCTP over PCIe de-packetization logic 1016, MCTP packets are disassembled to extract information other than extracted at segment mapping logic 1050.

In one embodiment, root complex 1000 receives a PCIe management message. The PCIe management message is transmitted as a MCTP packet where VDM format is utilized. The message (now a MCTP packet) is sent to SAD 1046 to determine whether to interpret a portion of the EID field of the VDM of the MCTP packet as a PCIe bus segment identifier. When a portion of destination EID field of the VDM format is determined to be interpreted as a PCIe bus segment identifier, segment mapping logic 1050 particularly MCTP packet segment ID extraction logic 1058 extracts the PCIe bus segment identifier. Then MCTP over PCIe management logic 1022 routes the MCTP packet to a PCIe bus segment specified.

As discussed herein above, BIOS 1048 may store a setting for the computing system that root complex 1000 belongs to, the setting determines whether to interpret portion of destination EID field of the VDM format of a received PCIe management message being a PCIe bus segment identifier and when a PCIe bus segment identifier is to be extracted, the setting indicates the number of bits and location of the bits for interpretation. The setting may also determine whether to interpret a portion of a PCI target identifier as a processor node identifier.

The operations of the flow diagram have been described with reference to the exemplary embodiment of FIG. 10. However, it should be understood that the operations of flow diagrams can be performed by embodiments of the invention other than those discussed with reference to FIGS. 3 and 5, and the embodiments discussed with reference to FIG. 10 can perform operations different than those discussed with reference to the flow diagrams of FIGS. 3 and 5.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 15:
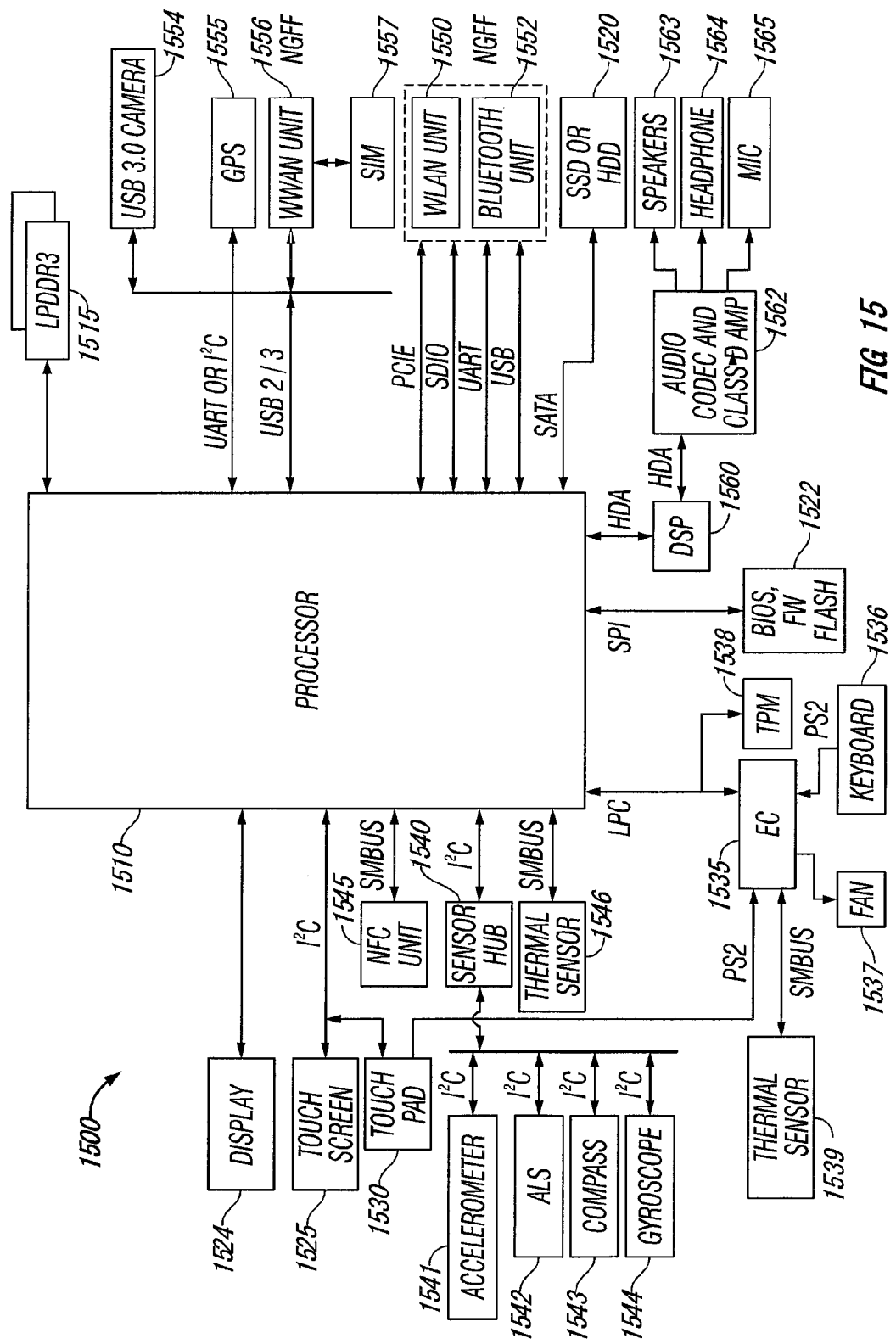
FIG. 15 illustrates an embodiment of a block diagram for a computing system.

Referring now to FIG. 15, a block diagram of components present in a computer system in accordance with an embodiment of the present invention is illustrated. As shown in FIG. 15, system 1500 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 15 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 15, a processor 1510, in one embodiment, includes a microprocessor, multi-core processor, multi-threaded processor, an ultra low voltage processor, an embedded processor, or other known processing element. In the illustrated implementation, processor 1510 acts as a main processing unit and central hub for communication with many of the various components of the system 1500. As one example, processor 1500 is implemented as a system on a chip (SoC). As a specific illustrative example, processor 1510 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1510 in one implementation will be discussed further below to provide an illustrative example.

Processor 1510, in one embodiment, communicates with a system memory 1515. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, Mini-DIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1520 may also couple to processor 1510. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 15, a flash device 1522 may be coupled to processor 1510, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1500. Specifically shown in the embodiment of FIG. 15 is a display 1524 which may be a high definition LCD or LED panel configured within a lid portion of the chassis. This display panel may also provide for a touch screen 1525, e.g., adapted externally over the display panel such that via a user's interaction with this touch screen, user inputs can be provided to the system to enable desired operations, e.g., with regard to the display of information, accessing of information and so forth. In one embodiment, display 1524 may be coupled to processor 1510 via a display interconnect that can be implemented as a high performance graphics interconnect. Touch screen 1525 may be coupled to processor 1510 via another interconnect, which in an embodiment can be an I$^2$C interconnect. As further shown in FIG. 15, in addition to touch screen 1525, user input by way of touch can also occur via a touch pad 1530 which may be configured within the chassis and may also be coupled to the same I$^2$C interconnect as touch screen 1525.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920× 1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1510 in different manners. Certain inertial and environmental sensors may couple to processor 1510 through a sensor hub 1540, e.g., via an I²C interconnect. In the embodiment shown in FIG. 15, these sensors may include an accelerometer 1541, an ambient light sensor (ALS) 1542, a compass 1543 and a gyroscope 1544. Other environmental sensors may include one or more thermal sensors 1546 which in some embodiments couple to processor 1510 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 15, various peripheral devices may couple to processor 1510 via a low pin count (LPC) interconnect. In the embodiment shown, various components can be coupled through an embedded controller 1535. Such components can include a keyboard 1536 (e.g., coupled via a PS2 interface), a fan 1537, and a thermal sensor 1539. In some embodiments, touch pad 1530 may also couple to EC 1535 via a PS2 interface. In addition, a security processor such as a trusted platform module (TPM) 1538 in accordance with the Trusted Computing Group (TCG) TPM Specification Version 1.2, dated Oct. 2, 2003, may also couple to processor 1510 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1500 can communicate with external devices in a variety of manners, including wirelessly. In the embodiment shown in FIG. 15, various wireless modules, each of which can correspond to a radio configured for a particular wireless communication protocol, are present. One manner for wireless communication in a short range such as a near field may be via a near field communication (NFC) unit 1545 which may communicate, in one embodiment with processor 1510 via an SMBus. Note that via this NFC unit 1545, devices in close proximity to each other can communicate. For example, a user can enable system 1500 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 15, additional wireless units can include other short range wireless engines including a WLAN unit 1550 and a Bluetooth unit 1552. Using WLAN unit 1550, Wi-Fi™ communications in accordance with a given Institute of Electrical and Electronics Engineers (IEEE) 802.11 standard can be realized, while via Bluetooth unit 1552, short range communications via a Bluetooth protocol can occur. These units may communicate with processor 1510 via, e.g., a USB link or a universal asynchronous receiver transmitter (UART) link. Or these units may couple to processor 1510 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1556 which in turn may couple to a subscriber identity module (SIM) 1557. In addition, to enable receipt and use of location information, a GPS module 1555 may also be present. Note that in the embodiment shown in FIG. 15, WWAN unit 1556 and an integrated capture device such as a camera module 1554 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1560, which may couple to processor 1510 via a high definition audio (HDA) link. Similarly, DSP 1560 may communicate with an integrated coder/decoder (CODEC) and amplifier 1562 that in turn may couple to output speakers 1563 which may be implemented within the chassis. Similarly, amplifier and CODEC 1562 can be coupled to receive audio inputs from a microphone 1565 which in an embodiment can be implemented via dual array microphones (such as a digital microphone array) to provide for high quality audio inputs to enable voice-activated control of various operations within the system. Note also that audio outputs can be provided from amplifier/CODEC 1562 to a headphone jack 1564. Although shown with these particular components in the embodiment of FIG. 15, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1510 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1535. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1535 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 15, understand the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 16:
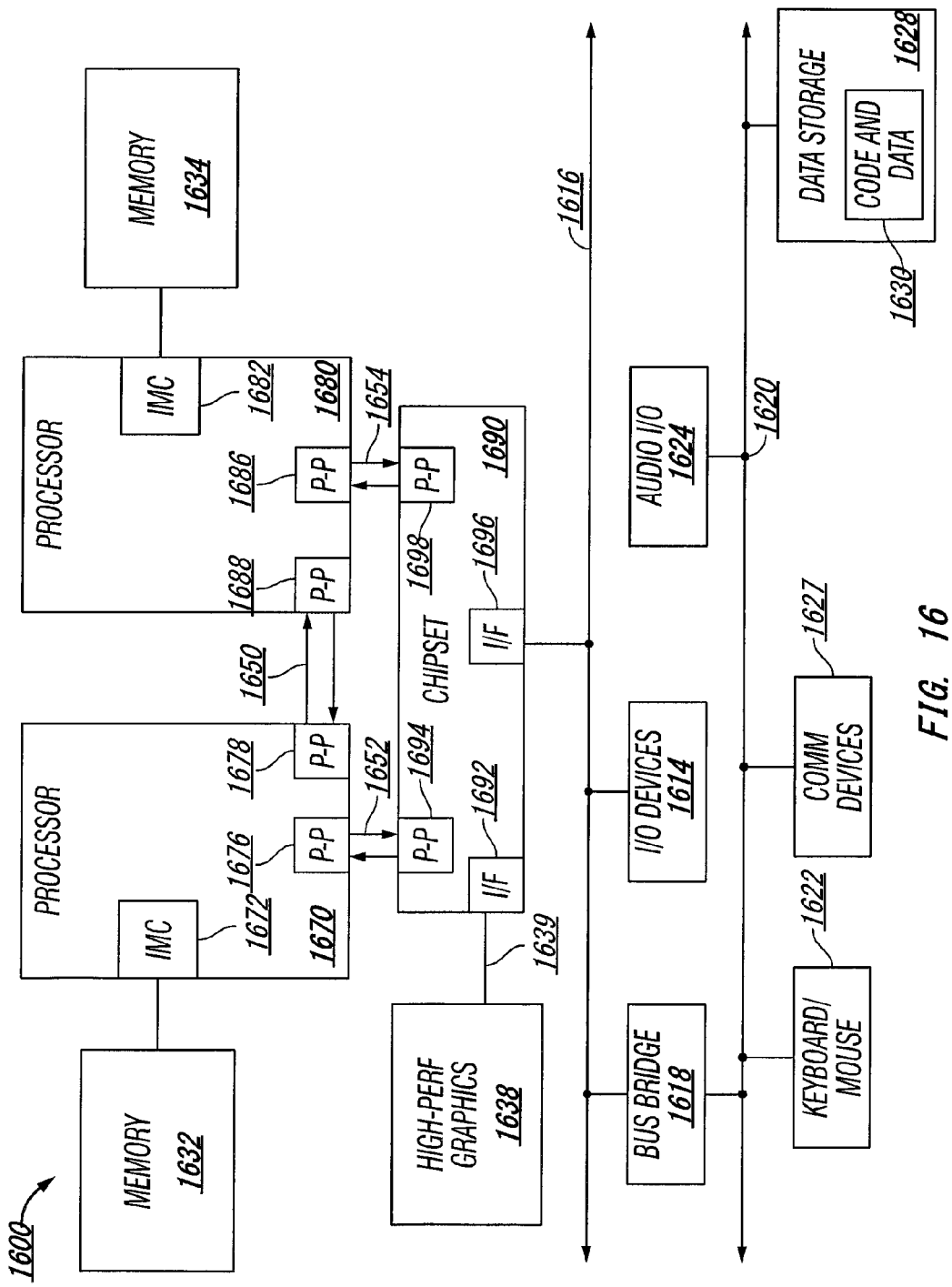
FIG. 16 illustrates another embodiment of a block diagram for a computing system.

Referring now to FIG. 16, shown is a block diagram of a second system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of a processor. In one embodiment, 1652 and 1654 are part of a serial, point-to-point coherent interconnect fabric, such as Intel's Quick Path Interconnect (QPI) architecture. As a result, the invention may be implemented within the QPI architecture.

While shown with only two processors 1670, 1680, it is to be understood that the scope of the present invention is not so limited. In other embodiments, one or more additional processors may be present in a given processor.

Processors 1670 and 1680 are shown including integrated memory controller units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 each exchange information with a chipset 1690 via individual P-P interfaces 1652, 1654 using point to point interface circuits 1676, 1694, 1686, 1698. Chipset 1690 also exchanges information with a high-performance graphics circuit 1638 via an interface circuit 1692 along a high-performance graphics interconnect 1639.

A shared cache (not shown) may be included in either processor or outside of both processors; yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 are coupled to first bus 1616, along with a bus bridge 1618 which couples first bus 1616 to a second bus 1620. In one embodiment, second bus 1620 includes a low pin count (LPC) bus. Various devices are coupled to second bus 1620 including, for example, a keyboard and/or mouse 1622, communication devices 1627 and a storage unit 1628 such as a disk drive or other mass storage device which often includes instructions/code and data 1630, in one embodiment. Further, an audio I/O 1624 is shown coupled to second bus 1620. Note that other architectures are possible, where the included components and interconnect architectures vary. For example, instead of the point-to-point architecture of FIG. 16, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EE- PROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Exemplary embodiments include a method to manage platform management messages through multiple peripheral component interconnect express (PCIe) segments implemented on a root complex of a computing system, the method comprising: receiving a PCIe management message as a management component transport protocol (MCTP) packet, wherein the MCTP packet utilizes a vender defined message (VDM) format; extracting a PCIe bus segment identifier from a destination endpoint identifier (EID) field of the MCTP packet; and routing the received PCIe management message to a PCIe bus segment identified by the PCIe bus segment identifier.

In some embodiments of the method, one or more of the following are implemented either in conjunction with each other or individually: i) wherein determining whether to interpret the portion of destination EID field of the VDM format of the received PCIe management message being a PCI bus segment identifier comprises checking a setting within a basic input/out system (BIOS) of the computing system; ii) wherein the BIOS of the computing system specifies a number of bits within the EID destination field of the VDM format of the received PCIe management message is to be interpreted as a PCIe bus segment identifier; iii) wherein the setting within the BIOS indicates whether to interpret the portion of destination EID field of the VDM format of the received PCIe management message as a PCIe bus segment identifier or to interpret a portion of a PCI target identifier field of the VDM format as a processor node identifier; iv) wherein the setting within the BIOS of the computing system indicates that the portion of a PCI target identifier field of the VDM format of the received PCIe management message being interpreted as a processor node identifier, wherein the PCIe management message is routed to the identified processor node, and wherein the identified processor node is coupled with a first processor from which the PCIe message is received through a point-to-point processor interconnect; v) determining a number of bits within the EID destination field of the VDM format of the received PCIe management message is to be interpreted as a PCIe bus segment identifier prior to extracting the PCIe bus segment identifier when the portion of destination EID field of the VDM format is determined to be interpreted as the PCIe bus segment identifier; vi) wherein the portion of destination EID field of the VDM format is to be interpreted as a PCIe bus segment identifier is one of one bit, two bits, three bits, four bits, and five bits; vii) wherein routing the PCIe management message comprises comparing the PCIe bus segment identifier within the portion of destination EID field of the VDM format with a register of the root complex containing a segment identifier associated with a first processor; viii) wherein the PCIe management message contains the PCIe bus segment identifier being inserted by a second processor of the computing system; ix) wherein the second processor of the computing system further contain a PCIe bus segment identifier inserted in a source EID field.

Exemplary embodiments include an apparatus, comprising: a root complex, the root complex including: an management component transport protocol (MCTP) message logic configured to receive a peripheral component interconnect express (PCIe) management message, the PCIe management message being transmitted as a MCTP packet, wherein the MCTP packet utilizes a vender defined message (VDM) format; a source address decoder logic configured to determine whether to interpret a portion of destination endpoint identifier (EID) field of the VDM format of the received PCIe management message as a PCIe bus segment identifier; an MCTP packet segmentation identifier extraction logic configured to extract the PCIe bus segment identifier when a portion of destination EID field of the VDM format is determined to be interpreted as a PCIe bus segment identifier; and an MCTP over PCIe management logic configured to route the received PCIe management message to a PCIe bus segment specified by the PCIe bus segment identifier within the portion of destination EID field of the VDM format.

In some embodiments of the apparatus, one or more of the following are implemented either in conjunction with each other or individually: i) wherein the computing system further includes a basic input/out system (BIOS) configured to store a setting for the computing system to determine whether to interpret the portion of destination EID field of the VDM format of the received PCIe management message being a PCIe bus segment identifier; ii) wherein the BIOS of the computing system specifies a number of bits within the EID destination field of the VDM format of the received PCIe management message is to be interpreted as a PCIe bus segment identifier; iii) wherein the setting within the BIOS indicates whether to interpret the portion of destination EID field of the VDM format of the received PCIe management message as a PCIe bus segment identifier or to interpret a portion of a PCI target identifier field of the VDM format of the received PCIe management message as a processor node identifier; iv) wherein the setting within the BIOS of the computing system indicates that the portion of a PCI target identifier field of the VDM format of the received PCIe management message being interpreted as a processor node identifier, wherein the PCIe management message is routed to the identified processor node, and wherein the identified processor node is coupled with a first processor from which the PCIe message is received through a point-to-point processor interconnect; v) wherein the packet interpretation logic further configured to determine a number of bits within the EID destination field of the VDM format of the received PCIe management message is to be interpreted as a PCIe bus segment identifier prior to extracting the PCIe bus segment identifier when the portion of destination EID field is determined to be interpreted as the PCIe bus segment identifier; vi) wherein the portion of destination EID field of the VDM format of the received PCIe management message is to be interpreted as a PCIe bus segment identifier is one of one bit, two bits, three bits, four bits, and five bits; vii) wherein the root complex further comprises a local segment identifier register configured to store a segment identifier of a local PCIe bus segment of a first processor, and wherein the stored segment identifier of the local PCIe bus segment is utilized to compare with an extracted PCIe bus segment identifier of a received MCTP message; viii) a second processor, wherein the second processor is configured to insert a PCIe bus segment identifier into a MCTP message to be transmitted; ix) wherein the second processor is further configured to insert the PCIe bus segment identifier in a source EID field of the MCTP message to be transmitted.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method to manage platform management messages comprising:
    receiving a serial differential, point-to-point interconnect management message as a media-independent protocol packet, wherein the media-independent protocol packet utilizes a Management Component Transport Protocol (MCTP) over Peripheral Component Interconnect (PCI) Express (PCIe) packet format allowing an extension of the serial, differential, point-to-point interconnect;
    extracting a bus segment identifier and an endpoint identifier from distinct portions of a destination endpoint identifier field of the packet having the MCTP over PCIe packet format; and
    routing the received management message using the bus segment identifier and the endpoint identifier, including routing the received management message to a bus segment uniquely identified by the bus segment identifier, including using a local segment identifier register to select between use of the endpoint identifier or target bus identifier field bits in order to lookup a target identifier with a MCTP source address decoder.

2. The method of claim 1, further comprising determining whether to interpret the portion of a destination field of the format allowing an extension of the serial, differential, point-to-point interconnect of the received serial differential, point-to-point interconnect management message as a bus segment identifier by checking a setting within a basic input/out system (BIOS) of the computing system.

3. The method of claim 2, wherein the BIOS of the computing system specifies a number of bits within the destination field of the format allowing an extension of the serial, differential, point-to-point interconnect of the received serial differential, point-to-point interconnect management message is to be interpreted as a serial differential, point-to-point interconnect bus segment identifier.

4. The method of claim 2, wherein the setting within the BIOS indicates whether to interpret the portion of destination field of the format allowing an extension of the serial, differential, point-to-point interconnect of the received serial differential, point-to-point interconnect management message as a serial differential, point-to-point interconnect bus segment identifier or to interpret a portion of a target identifier field of the format allowing an extension of the serial, differential, point-to-point interconnect as a processor node identifier.

5. The method of claim 4, wherein the setting within the BIOS of the computing system indicates that the portion of a target identifier field of the format allowing an extension of the serial, differential, point-to-point interconnect of the received serial differential, point-to-point interconnect management message being interpreted as a processor node identifier, wherein the serial differential, point-to-point interconnect management message is routed to the identified processor node, and wherein the identified processor node is coupled with a first processor from which the serial differential, point-to-point interconnect message is received through a point-to-point processor interconnect.

6. The method of claim 2, furthering comprising determining a number of bits within the destination field of the format allowing an extension of the serial, differential, point-to-point interconnect of the received serial differential, point-to-point interconnect management message is to be interpreted as a serial differential, point-to-point interconnect bus segment identifier prior to extracting the serial differential, point-to-point interconnect bus segment identifier when the portion of destination field of the format allowing an extension of the serial, differential, point-to-point interconnect is determined to be interpreted as the serial differential, point-to-point interconnect bus segment identifier.

7. The method of claim 1, wherein the portion of destination field of the format allowing an extension of the serial, differential, point-to-point interconnect is to be interpreted as a serial differential, point-to-point interconnect bus segment identifier is one of one bit, two bits, three bits, four bits, and five bits.

8. The method of claim 1, wherein routing the serial differential, point-to-point interconnect management message comprises comparing the serial differential, point-to-point interconnect bus segment identifier within the portion of destination field of the format allowing an extension of the serial, differential, point-to-point interconnect with a register of the root complex containing a segment identifier associated with a first processor.

9. The method of claim 8, wherein the serial differential, point-to-point interconnect management message contains the serial differential, point-to-point interconnect bus segment identifier being inserted by a second processor of the computing system.

10. The method of claim 9, wherein the second processor of the computing system further contain a serial differential, point-to-point interconnect bus segment identifier inserted in a source field.

11. An apparatus, comprising:
    a root complex, the root complex including:
        message logic configured to receive a serial differential, point-to-point interconnect management message, the serial differential, point-to-point interconnect management message to be transmitted as a media-independent protocol packet, wherein the media-independent protocol packet is to utilize a Management Component Transport Protocol (MCTP) over Peripheral Component Interconnect (PCI) Express (PCIe) packet format allowing an extension of the serial, differential, point-to-point interconnect;
        decoder logic configured to determine whether to interpret a portion of an endpoint destination field of the packet having the MCTP over PCIe packet format allowing an extension of the serial, differential, point-to-point interconnect of the serial differential, point-to-point interconnect management message that is to be received as a serial differential, point-to-point interconnect bus segment identifier;
        extraction logic configured to extract the serial differential, point-to-point interconnect bus segment identifier and an endpoint identifier from distinct portions of the destination field of the packet having the MCTP over PCIe packet format when a portion of destination field of the format allowing an extension of the serial, differential, point-to-point interconnect is determined to be interpreted as a serial differential, point-to-point interconnect bus segment identifier; and management logic configured to route the received serial differential, point-to-point interconnect management message, using the point-to-point interconnect bus segment identifier and the endpoint identifier, to a serial differential, point-to-point interconnect bus segment to be uniquely specified by the serial differential, point-to-point interconnect bus segment identifier within the portion of destination field of the format allowing an extension of the serial, differential, point-to-point interconnect, the management logic including a local segment identifier register to select between use of the endpoint identifier or target bus identifier field bits in order to lookup a target identifier with a MCTP source address decoder.

12. The apparatus of claim 11, wherein the computing system further includes a basic input/out system (BIOS) configured to store a setting for the computing system to determine whether to interpret the portion of destination field of the format allowing an extension of the serial, differential, point-to-point interconnect of the received serial differential, point-to-point interconnect management message being a serial differential, point-to-point interconnect bus segment identifier.

13. The apparatus of claim 12, wherein the BIOS of the computing system specifies a number of bits within the destination field of the format allowing an extension of the serial, differential, point-to-point interconnect of the received serial differential, point-to-point interconnect management message is to be interpreted as a serial differential, point-to-point interconnect bus segment identifier.

14. The apparatus of claim 12, wherein the setting within the BIOS indicates whether to interpret the portion of destination field of the format allowing an extension of the serial, differential, point-to-point interconnect of the received serial differential, point-to-point interconnect management message as a serial differential, point-to-point interconnect bus segment identifier or to interpret a portion of a target identifier field of the format allowing an extension of the serial, differential, point-to-point interconnect of the received serial differential, point-to-point interconnect management message as a processor node identifier.

15. The apparatus of claim 14, wherein the setting within the BIOS of the computing system indicates that the portion of a target identifier field of the format allowing an extension of the serial, differential, point-to-point interconnect of the received serial differential, point-to-point interconnect management message being interpreted as a processor node identifier, wherein the serial differential, point-to-point interconnect management message is routed to the identified processor node, and wherein the identified processor node is coupled with a first processor from which the serial differential, point-to-point interconnect message is received through a point-to-point processor interconnect.

16. The apparatus of claim 11, wherein the packet interpretation logic further configured to determine a number of bits within the destination field of the format allowing an extension of the serial, differential, point-to-point interconnect of the received serial differential, point-to-point interconnect management message is to be interpreted as a serial differential, point-to-point interconnect bus segment identifier prior to extracting the serial differential, point-to-point interconnect bus segment identifier when the portion of destination field is determined to be interpreted as the serial differential, point-to-point interconnect bus segment identifier.

17. The apparatus of claim 11, wherein the portion of destination field of the format allowing an extension of the serial, differential, point-to-point interconnect of the received serial differential, point-to-point interconnect management message is to be interpreted as a serial differential, point-to-point interconnect bus segment identifier is one of one bit, two bits, three bits, four bits, and five bits.

18. The apparatus of claim 11, wherein the root complex further comprises a local segment identifier register configured to store a segment identifier of a local serial differential, point-to-point interconnect bus segment of a first processor, and wherein the stored segment identifier of the local serial differential, point-to-point interconnect bus segment is utilized to compare with an extracted serial differential, point-to-point interconnect bus segment identifier of a received media-independent protocol message.

19. The apparatus of claim 18, further comprising a second processor, wherein the second processor is configured to insert a serial differential, point-to-point interconnect bus segment identifier into a media-independent protocol message to be transmitted.

20. The apparatus of claim 19, wherein the second processor is further configured to insert the serial differential, point-to-point interconnect bus segment identifier in a source field of the media-independent protocol message to be transmitted.

21. The apparatus of claim 11, further comprising:
an endpoint coupled to the root complex, the endpoint to:
receive a serial differential, point-to-point interconnect management message, the serial differential, point-to-point interconnect management message to be transmitted as a media-independent protocol packet, wherein the media-independent protocol packet is to utilize a format allowing an extension of the serial, differential, point-to-point interconnect;
determine whether to interpret a portion of destination field of the format allowing an extension of the serial, differential, point-to-point interconnect of the serial differential, point-to-point interconnect management message that is to be received as a serial differential, point-to-point interconnect bus segment identifier;
extract the serial differential, point-to-point interconnect bus segment identifier and an endpoint identifier from distinct portions of the destination field when a portion of destination field of the format allowing an extension of the serial, differential, point-to-point interconnect is determined to be interpreted as a serial differential, point-to-point interconnect bus segment identifier; and
route the received serial differential, point-to-point interconnect management message, using the point-to-point interconnect bus segment identifier and the endpoint identifier, to a serial differential, point-to-point interconnect bus segment to be uniquely specified by the serial differential, point-to-point interconnect bus segment identifier within the portion of destination EID field of the format allowing an extension of the serial, differential, point-to-point interconnect.

22. The apparatus of claim 11, further comprising:
a touch enabled input device.

23. An apparatus, comprising:
a root complex, the root complex including:
an management component transport protocol (MCTP) message logic configured to receive a peripheral component interconnect express (PCIe) management message, the PCIe management message being transmitted as a MCTP packet, wherein the MCTP packet utilizes a Management Component Transport Protocol (MCTP) over Peripheral Component Interconnect (PCI) Express (PCIe) packet format allowing an extension of the serial, differential, point-to-point interconnect;

a local segment identifier register to select between use of the endpoint identifier or target bus identifier field bits a source address decoder logic configured to determine whether to interpret a portion of destination field of the format allowing an extension of the serial, differential, point-to-point interconnect of the received PCIe management message as a PCIe bus segment identifier, the source address decoder logic operable to perform a target identifier lookup based on a selection by the local segment identifier register;

an MCTP packet segmentation identifier extraction logic configured to extract the PCIe bus segment identifier when a portion of an endpoint destination field of the MCTP over PCIe packet format allowing an extension of the serial, differential, point-to-point interconnect is determined to be interpreted as a PCIe bus segment identifier; and an MCTP over PCIe management logic configured to route the received PCIe management message to a PCIe bus segment specified by the PCIe bus segment identifier within the portion of destination field of the format allowing an extension of the serial, differential, point-to-point interconnect.

24. The apparatus of claim 23, wherein the computing system further includes a basic input/out system (BIOS) configured to store a setting for the computing system to determine whether to interpret the portion of destination field of the format allowing an extension of the serial, differential, point-to-point interconnect of the received PCIe management message being a PCIe bus segment identifier.

25. The apparatus of claim 23, wherein the packet interpretation logic further configured to determine a number of bits within the destination field of the format allowing an extension of the serial, differential, point-to-point interconnect of the received PCIe management message is to be interpreted as a PCIe bus segment identifier prior to extracting the PCIe bus segment identifier when the portion of destination field is determined to be interpreted as the PCIe bus segment identifier.

* * * * *